US011834040B2

(12) United States Patent
Aharony et al.

(10) Patent No.: US 11,834,040 B2
(45) Date of Patent: *Dec. 5, 2023

(54) RECOGNITION AND PREDICTION OF LANE CONSTRAINTS AND CONSTRUCTION AREAS IN NAVIGATION

(71) Applicant: Mobileye Vision Technologies Ltd., Jerusalem (IL)

(72) Inventors: Hila Aharony, Jerusalem (IL); Maria Dyshel, Jerusalem (IL); Amir Harel, Rehovot (IL); Meital Rabani, Jerusalem (IL); Shaked Shammah, Jerusalem (IL); Kobi Horn, Beit Zayit (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 145 days.

This patent is subject to a terminal disclaimer.

(21) Appl. No.: 17/175,915

(22) Filed: Feb. 15, 2021

(65) Prior Publication Data

US 2021/0291827 A1 Sep. 23, 2021

Related U.S. Application Data

(60) Continuation of application No. 16/179,176, filed on Nov. 2, 2018, now Pat. No. 10,926,763, which is a
(Continued)

(51) Int. Cl.
*B60W 30/095* (2012.01)
*B60W 10/20* (2006.01)
(Continued)

(52) U.S. Cl.
CPC ........ *B60W 30/0956* (2013.01); *B60W 10/04* (2013.01); *B60W 10/18* (2013.01);
(Continued)

(58) Field of Classification Search
CPC ........ B60W 30/0956; B60W 30/0953; B60W 10/04; B60W 10/18; B60W 10/20;
(Continued)

(56) References Cited

U.S. PATENT DOCUMENTS 4,970,653 A 11/1990 Kenue
5,521,633 A 5/1996 Nakajima et al.
(Continued)

FOREIGN PATENT DOCUMENTS

CN 1218355 6/1999
CN 102132335 7/2011
(Continued)

OTHER PUBLICATIONS

"European Application Serial No. 15793913.3, Response filed Aug. 10, 2021 to Communication Pursuant to Article 94(3) EPC dated Apr. 28, 2021", 48 pgs.
(Continued)

*Primary Examiner* — Gertrude Arthur Jeanglaude
(74) *Attorney, Agent, or Firm* — Schwegman Lundberg & Woessner, P.A.

(57) ABSTRACT

Systems and methods use cameras to provide autonomous and/or driver-assist navigation features. In some implementations, techniques for predicting the location of first roadway lane constraints are provided. The system may receive multiple images of a roadway in a vicinity of a vehicle, recognize a first roadway lane constraint, and, when lane prediction conditions are determined to be satisfied, predict a location of a second roadway lane constraint. In some implementations, techniques for detecting and responding to construction zones are provided. The system may receive multiple images of a roadway in a vicinity of a vehicle, recognize indicators of a construction zone in the images, determine that the vehicle is proximate to a construction
(Continued)

zone, and output a signal indicating that the vehicle is proximate to a construction zone.

19 Claims, 29 Drawing Sheets

Related U.S. Application Data division of application No. 14/828,112, filed on Aug. 17, 2015, now Pat. No. 10,150,473.

(60) Provisional application No. 62/038,426, filed on Aug. 18, 2014.

(51) Int. Cl.
| | | |
|---|---|---|
| *B60W 10/18* | (2012.01) | |
| *B60W 10/04* | (2006.01) | |
| *G08G 1/0962* | (2006.01) | |
| *G06V 20/56* | (2022.01) | |

(52) U.S. Cl.
CPC ........ *B60W 10/20* (2013.01); *B60W 30/0953* (2013.01); *G06V 20/588* (2022.01); *G08G 1/09623* (2013.01); *B60W 2420/403* (2013.01); *B60W 2710/18* (2013.01); *B60W 2710/20* (2013.01); *B60W 2720/10* (2013.01)

(58) Field of Classification Search
CPC ....... B60W 2420/403; B60W 2710/18; B60W 2710/20; B60W 2720/10; G06V 20/588; G08G 1/09623
See application file for complete search history.

(56) References Cited

U.S. PATENT DOCUMENTS

| | | | |
|---|---|---|---|
| 5,765,116 | A | 6/1998 | Wilson-jones et al. |
| 8,452,055 | B2 | 5/2013 | Stein et al. |
| 10,150,473 | B2 | 12/2018 | Aharony et al. |
| 10,926,763 | B2 * | 2/2021 | Aharony ............ G08G 1/09623 |
| 2009/0102629 | A1 | 4/2009 | Kaller et al. |
| 2011/0301813 | A1 | 12/2011 | Sun et al. |
| 2013/0208945 | A1 | 8/2013 | Nunn et al. |
| 2013/0253753 | A1 | 9/2013 | Burnette et al. |
| 2014/0067187 | A1 | 3/2014 | Ferguson et al. |
| 2014/0372020 | A1 | 12/2014 | Stein |
| 2015/0086080 | A1 | 3/2015 | Stein et al. |
| 2015/0103159 | A1 | 4/2015 | Shashua et al. |
| 2015/0145664 | A1 | 5/2015 | You et al. |
| 2015/0145965 | A1 | 5/2015 | Livyatan et al. |
| 2015/0151725 | A1 | 6/2015 | Clarke et al. |
| 2015/0151742 | A1 | 6/2015 | Clarke et al. |
| 2015/0151751 | A1 | 6/2015 | Clarke et al. |
| 2015/0151753 | A1 | 6/2015 | Clarke et al. |
| 2015/0153735 | A1 | 6/2015 | Clarke et al. |
| 2016/0046290 | A1 | 2/2016 | Aharony et al. |
| 2019/0077400 | A1 | 3/2019 | Aharony et al. |

FOREIGN PATENT DOCUMENTS

| | | |
|---|---|---|
| CN | 102735256 | 10/2012 |
| CN | 102785620 A | 11/2012 |
| CN | 102789693 | 11/2012 |
| CN | 103153744 | 6/2013 |
| CN | 107111742 | 4/2021 |
| CN | 113158820 | 7/2021 |
| EP | 2325824 | 5/2011 |
| EP | 3183688 | 6/2017 |
| JP | 2007066047 | 3/2007 |
| WO | 0180068 | 10/2001 |
| WO | 2008130219 | 10/2008 |
| WO | 2013141226 | 9/2013 |
| WO | 2016027270 | 2/2016 |

OTHER PUBLICATIONS

"European Application Serial No. 15793913.3, Communication Pursuant to Article 94(3) EPC dated Sep. 24, 2021", 6 pgs.
Welch, Greg, "An Introduction to the Kalman Filter", SIGGRAPH 2001, (Aug. 12, 2001), 1-81.
"U.S. Appl. No. 14/828,112, Notice of Allowance dated Jul. 26, 2018", 10 pgs.
"U.S. Appl. No. 14/828,112, Examiner-Initiated Interview Summary dated Jul. 18, 2018", 1 pg.
"U.S. Appl. No. 14/828,112, Restriction Requirement dated Jun. 13, 2017", 7 pgs.
"U.S. Appl. No. 14/828,112, Non Final Office Action dated Aug. 29, 2017", 24 pgs.
"English translation for JP2007066047A".
"U.S. Appl. No. 14/828,112, Examiner Interview Summary dated Nov. 30, 2017", 3 pgs.
"U.S. Appl. No. 14/828,112, Non Final Office Action dated Jan. 2, 2018", 28 pgs.
"International Application Serial No. PCT IL2015 050590, International Search Report dated Sep. 30, 2015", 4 pgs.
"International Application Serial No. PCT IL2015 050590, Written Opinion dated Sep. 30, 2015", 6 pgs.
"International Application Serial No. PCT IL2015 050833, International Search Report dated Jan. 8, 2016", 3 pgs.
"International Application Serial No. PCT IL2015 050833, Written Opinion dated Jan. 8, 2016", 5 pgs.
"International Application Serial No. PCT IL2015 050833, International Preliminary Report on Patentability dated Mar. 2, 2017", 7 pgs.
"U.S. Appl. No. 14/828,112, Response filed Aug. 11, 2017 to Restriction Requirement dated Jun. 13, 2017", 3 pgs.
"U.S. Appl. No. 14/828,112, Response filed Nov. 29, 2017 to Non Final Office Action dated Aug. 29, 2017", 17 pgs.
"U.S. Appl. No. 14/828,112, Response filed Apr. 2, 2018 to Non Final Office Action dated Jan. 2, 2018", 16 pgs.
"Road2 Refinement", Mobileye Wiki, [Online] Retrieved from the internet:http: wiki mw index.php Road2 Refinement.html, (Oct. 6, 2014), 3 pgs.
"European Application Serial No. 15793913.3, Communication Pursuant to Article 94(3) EPC dated Feb. 7, 2018", 4 pgs.
"U.S. Appl. No. 14/828,112, 312 Amendment filed Oct. 26, 2018", 9 pgs.
"U.S. Appl. No. 14/828,112, Response filed Oct. 26, 2018 to Notice of Allowance dated Jul. 26, 2018", 9 pgs.
"U.S. Appl. No. 14/828,112, Notice of Allowability dated Nov. 9, 2018", 4 pgs.
"European Application Serial No. 15793913.3, Response filed Jun. 18, 2018 to Communication Pursuant to Article 94(3) EPC dated Feb. 7, 2018", 20 pgs.
"Chinese Application Serial No. 201580055136.5, Office Action dated Oct. 30, 2019", 13 pgs.
"Chinese Application Serial No. 201580055136.5, Response filed Mar. 16, 2020 to Office Action dated Oct. 30, 2019", w English claims, 83 pgs.
"European Application Serial No. 15793913.3, Communication Pursuant to Article 94(3) EPC dated May 18, 2020", 5 pgs.
"U.S. Appl. No. 16/179,176, Non Final Office Action dated Jul. 7, 2020", 6 pgs.
"Chinese Application Serial No. 201580055136.5, Office Action dated Jun. 22, 2020", w English Translation, 24 pgs.
"Chinese Application Serial No. 201580055136.5, Response filed Sep. 7, 2020 to Office Action dated Jun. 22, 2020", w English claims, 24 pgs.
"U.S. Appl. No. 16/179,176, Response filed Oct. 6, 2020 to Non Final Office Action dated Jul. 7, 2020", 7 pgs.
"U.S. Appl. No. 16/179,176, Notice of Allowance dated Oct. 26, 2020", 5 pgs.
"European Application Serial No. 15793913.3, Communication Pursuant to Article 94(3) EPC dated Dec. 22, 2020", 5 pgs.
"European Application Serial No. 15793913.3, Response filed Nov. 13, 2020 to Communication Pursuant to Article 94(3) EPC dated May 18, 2020", 51 pgs.

(56) References Cited

OTHER PUBLICATIONS

"U.S. Appl. No. 16/179,176, Supplemental Notice of Allowability dated Jan. 26, 2021", 2 pgs.
"U.S. Appl. No. 16/179,176, Supplemental Notice of Allowability dated Feb. 1, 2021", 2 pgs.
"Chinese Application Serial No. 202110335908.8, Voluntary Amendment filed Apr. 6, 2021", w English claims, 29 pgs.
"European Application Serial No. 15793913.3, Communication Pursuant to Article 94(3) EPC dated Apr. 28, 2021", 5 pgs.
"European Application Serial No. 15793913.3, Response filed Apr. 13, 2021 to Communication Pursuant to Article 94(3) EPC dated Dec. 22, 2020", 5 pgs.
Borkar, Amol, "Robust lane detection and tracking with ransac and Kalman filter", Image Processing (ICIP), 2009 16th IEEE International Conference On, IEEE, Piscataway, NJ, USA, (Nov. 7, 2009), 3261-3264.
Huang, Albert S, "Lane Estimation for Autonomous Vehicles using Vision and LIDAR", PhD-thesis, Retrieved from the Internet:URL:http: rvsn.csail.mit.edu Pubs phd_ashuang_2010feb_laneestimation.pdf[retrieved on Jul. 25, 2016], (Feb. 1, 2010).
"Chinese Application Serial No. 202110335908.8, Office Action dated Sep. 1, 2023", W/ English Claims, 26 pgs.

\* cited by examiner

RECOGNITION AND PREDICTION OF LANE CONSTRAINTS AND CONSTRUCTION AREAS IN NAVIGATION

CROSS REFERENCE TO RELATED APPLICATIONS

This application is a continuation of U.S. patent application Ser. No. 16/179,176, filed Nov. 2, 2018, which is a division of Ser. No. 14/828,112, filed Aug. 17, 2015, which claims the benefit of U.S. Provisional Patent Application No. 62/038,426, the entirety of which are incorporated herein by reference

FIELD OF THE DISCLOSURE

This disclosure relates generally to autonomous driving and/or driver assist technology and, more specifically, to systems and methods that use cameras to provide autonomous driving and/or driver assist technology features.

BACKGROUND

As technology continues to advance, the goal of a fully autonomous vehicle that is capable of navigating on roadways is on the horizon. Primarily, an autonomous vehicle may be able to identify its environment and navigate without input from a human operator. Autonomous vehicles may also take into account a variety of factors and make appropriate decisions based on those factors to safely and accurately reach an intended destination. For example, various objects—such as other vehicles and pedestrians—are encountered when a vehicle typically travels a roadway. Autonomous driving systems may recognize these objects in a vehicle's environment and take appropriate and timely action to avoid collisions. Additionally, autonomous driving systems may identify other indicators—such as traffic signals, traffic signs, and lane markings—that regulate vehicle movement (e.g., when the vehicle must stop and may go, a speed at which the vehicle must not exceed, where the vehicle must be positioned on the roadway, etc.). Autonomous driving systems may need to determine when a vehicle should change lanes, turn at intersections, change roadways, etc. As is evident from these examples, many factors may need to be addressed in order to provide an autonomous vehicle that is capable of navigating safely and accurately.

SUMMARY

Current autonomous or driver-assist (e.g., partially autonomous) vehicle systems may be unable to adequately identify a lane when lane lines (e.g., the marked lines that divide lanes) or other markings do not clearly indicate the locations of lane constraints on a roadway. For example, current systems may not function properly when a lane constraint cannot be identified from lines or markings detected in received images of a roadway; or, current systems may inaccurately identify a lane constraint where a lane constraint does not in reality exist. Current autonomous or driver-assist vehicle systems may also be unable to adequately identify or respond to construction zones on roadways, where modified vehicle control may be required, and where responding to certain roadway elements in a different manner may be advantageous. The inventors have recognized these and other problems which would be apparent from the present disclosure, which are addressed by the techniques disclosed herein.

Some embodiments consistent with the present disclosure provide systems and methods for autonomous or driver-assist vehicle navigation. Some disclosed embodiments may use cameras to provide autonomous vehicle navigation features. For example, consistent with some disclosed embodiments, the disclosed systems may include one, two, or more cameras that monitor the environment of a vehicle and cause a navigational response based on an analysis of images captured by one or more of the cameras.

In accordance with some embodiments, a computer system comprises a memory that stores instructions, and a processor that executes the instructions to cause the system to: receive, from a camera, multiple images of a roadway in a vicinity of a moving vehicle, recognize, based on the multiple images, a first roadway lane constraint, determine, based on the multiple images, that one or more defined lane prediction conditions are satisfied, in accordance with a determination that one or more defined lane prediction conditions are satisfied, predict a location of a second roadway lane constraint, and enable the moving vehicle to avoid the first roadway lane constraint and the second roadway lane constraint.

In accordance with some embodiments, a computer system comprises a memory that stores instructions and a processor that executes the instructions to cause the system to: receive, from a camera, multiple images of a roadway in a vicinity of a moving vehicle, recognize, in the multiple images, one or more indicators of a construction zone, determine, based on the one or more indicators, that the vehicle is proximate to a construction zone, and, in accordance with a determination that the vehicle is proximate to a construction zone, output a signal indicating that the vehicle is proximate to a construction zone.

DETAILED DESCRIPTION

Figure 1:
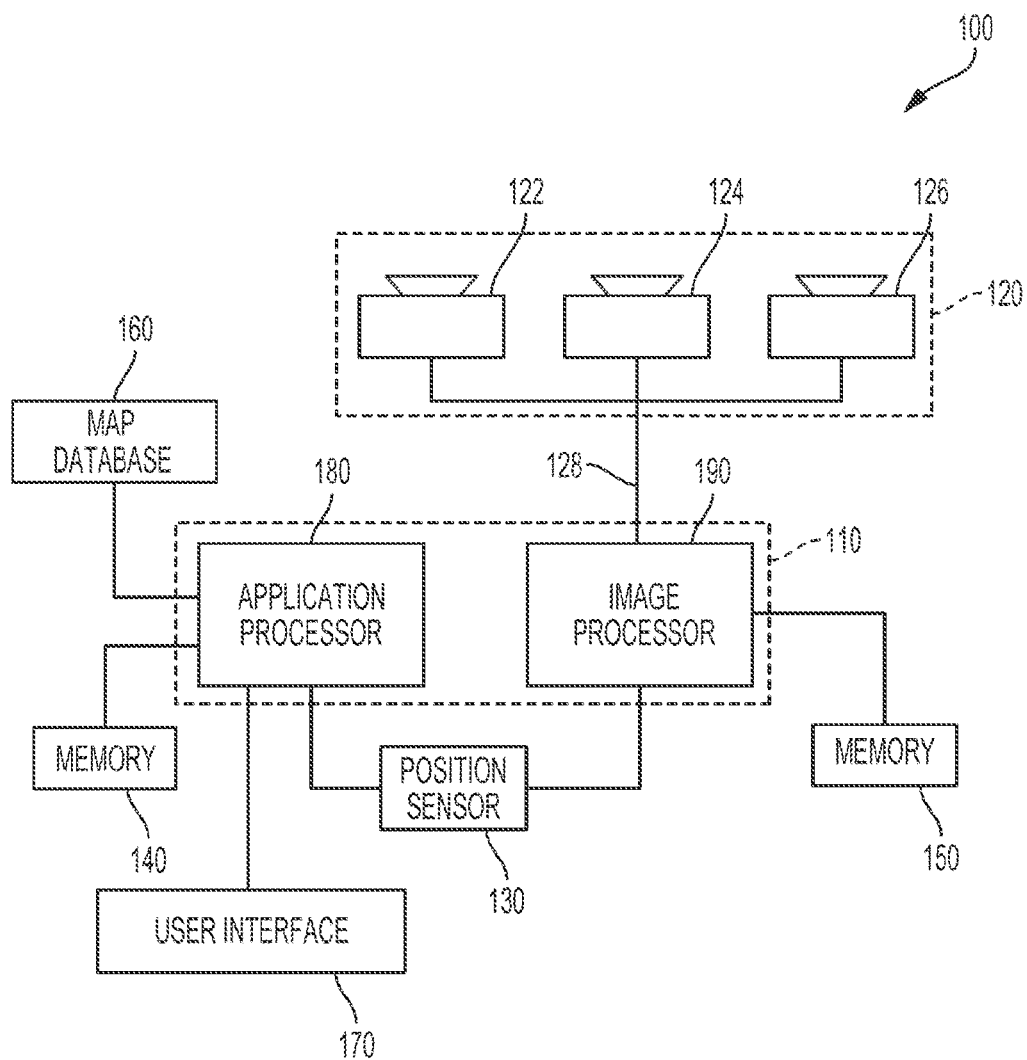
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

Disclosed embodiments provide systems and methods that use cameras to provide autonomous navigation, vehicle control, and/or driver assist technology features. Driver assist technology, as opposed to fully autonomous driving, refers to any suitable technology to assist drivers in the navigation and control of their vehicles, such as LKA (lane keeping assist), LDW (lane departure warning), acceleration of the vehicle, deceleration of the vehicle, steering of the vehicle, controlling vehicle braking, preparing the vehicle for an unavoidable collision, and/or any other suitable manner of controlling any aspect of the operation of the vehicle or assisting the driver in controlling any such aspect. In various embodiments, the system may include one, two or more cameras that monitor the environment of a vehicle. In some embodiments, the system may provide techniques for predicting the location of roadway lane constraints and/or techniques for detecting and responding to construction zones.

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, and a user interface 170. Processing unit 110 may include one or more processing devices. In some embodiments, processing unit 110 may include an application processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing unit 110 to image acquisition device 120. For example, data interface 128 may include any wired and/or wireless link or links for transmitting image data acquired by image accusation device 120 to processing unit 110.

Both application processor 180 and image processor 190 may include various types of processing devices. For example, either or both of application processor 180 and image processor 190 may include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, application processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments.

While FIG. 1 depicts two separate processing devices included in processing unit 110, more or fewer processing devices may be used. For example, in some embodiments, a single processing device may be used to accomplish the tasks of application processor 180 and image processor 190. In other embodiments, these tasks may be performed by more than two processing devices.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., application processor 180 and/or image processor 190), may control operation of various aspects of system 100. These memory units may include various databases and image processing software. The memory units may include random access memory, read only memory, flash memory, disk drives, optical storage, tape storage, removable storage and/or any other types of storage. In some embodiments, memory units 140, 150 may be separate from the application processor 180 and/or image processor 190. In other embodiments, these memory units may be integrated into application processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to application processor 180 and/or image processor 190.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, application processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.).

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
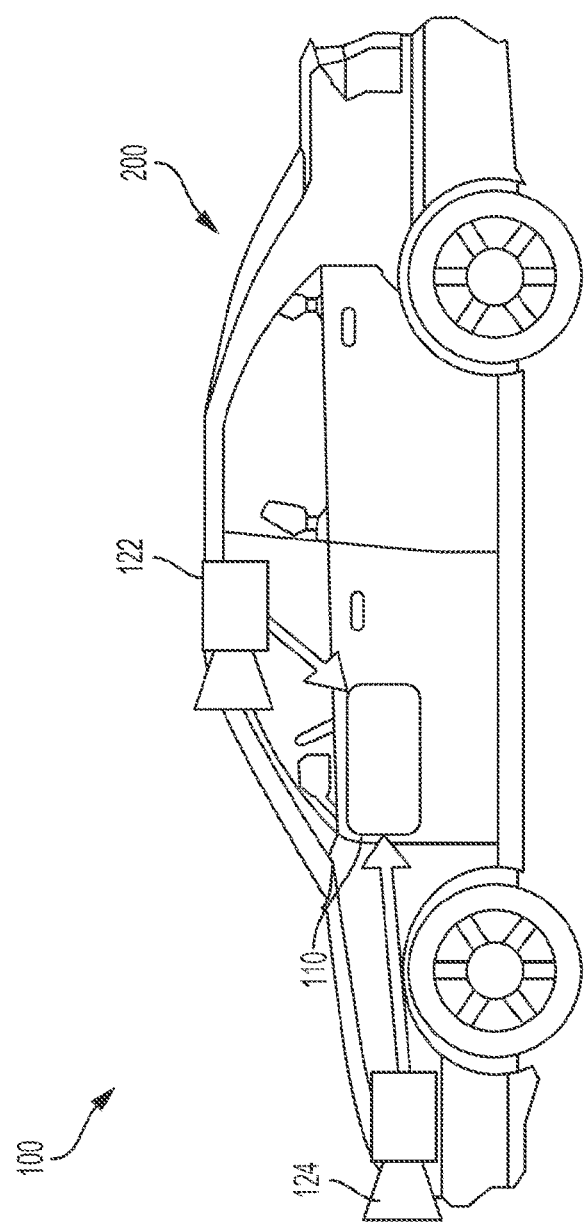
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
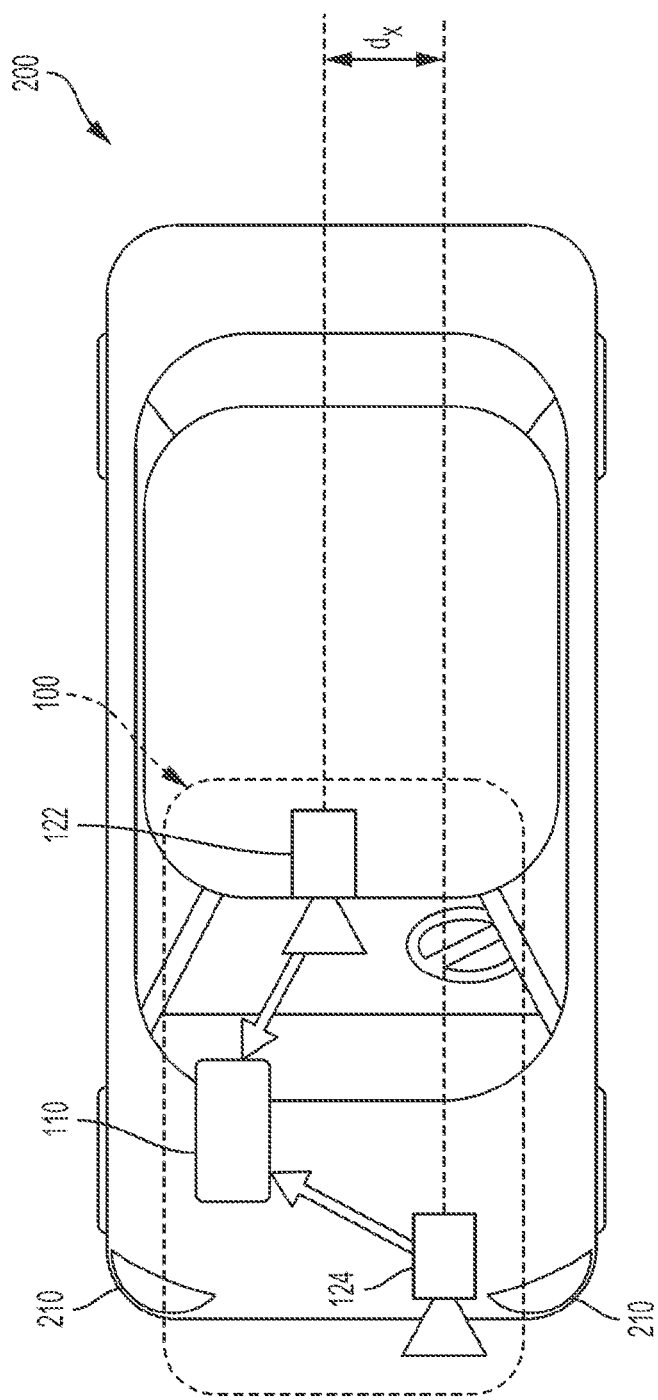
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 28, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
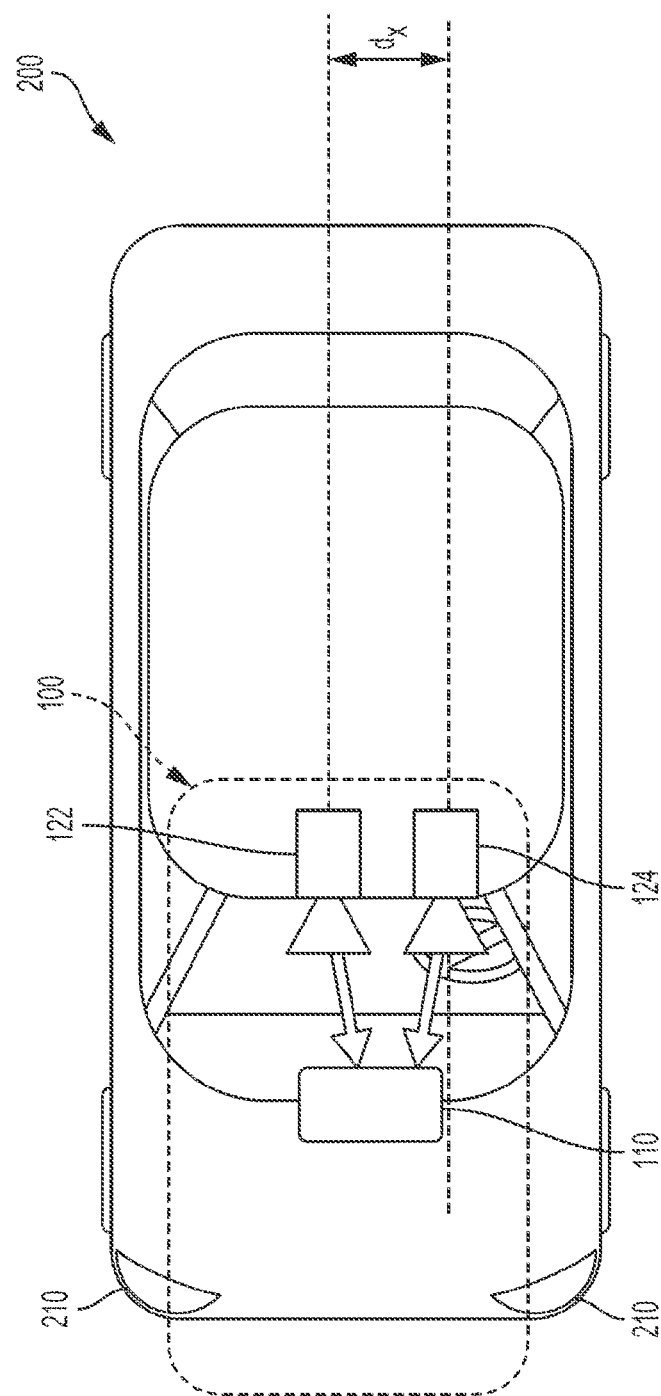
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
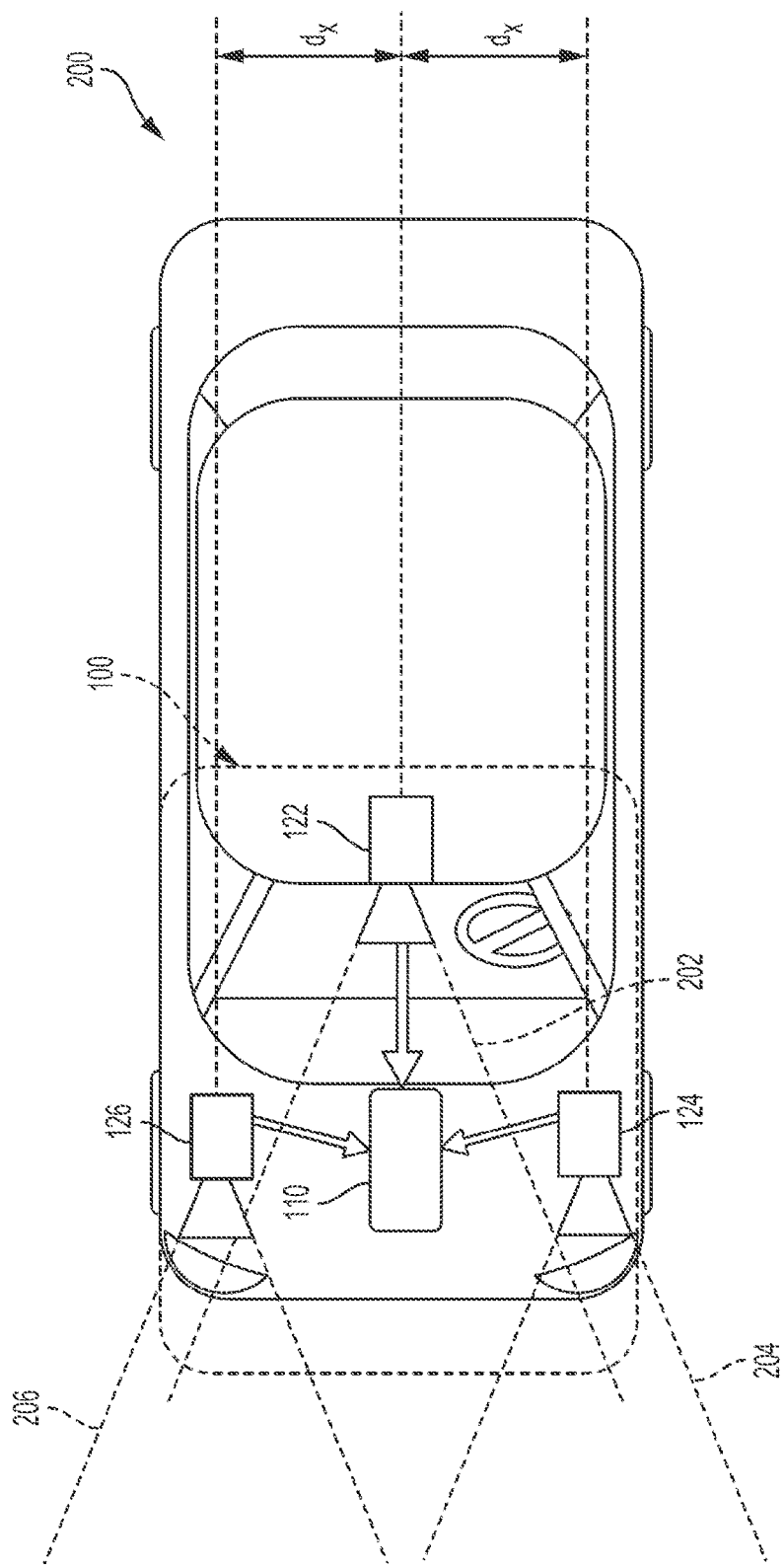
FIG. 2D is a diagrammatic top view representation of yet another embodiment of a vehicle including a system consistent with the disclosed embodiments.
Figure 2E:
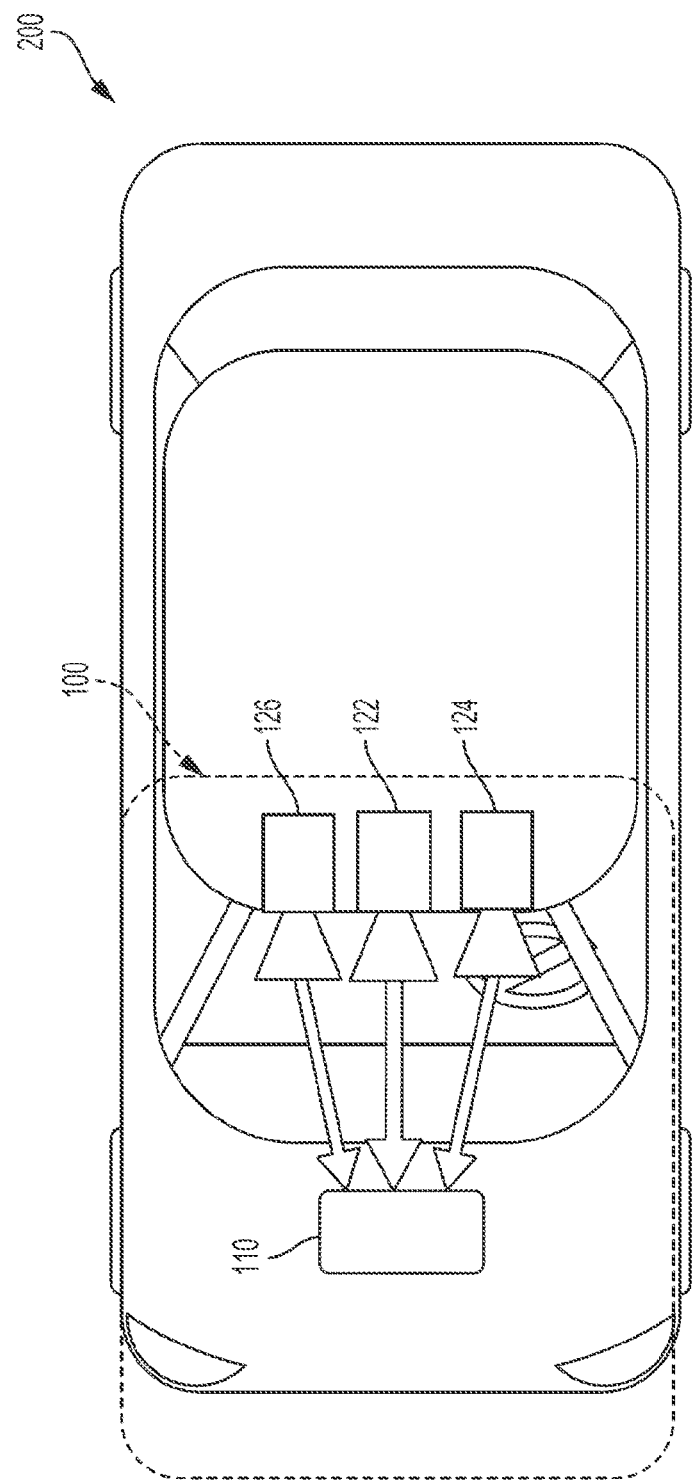
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, motorcycles, bicycles, self-balancing transport devices and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or different than (e.g., narrower than), a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by dx, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

In some embodiments, a system may define the "vicinity" of the vehicle according to predefined constraints or dynamically determined constraints. The vicinity of the vehicle may, for example, be considered any area within a certain distance of the vehicle in any one or more directions, such as 1 meter, 5 meters, 10 meters, 25 meters, 50 meters, 100 meters, 250 meters, 500 meters, or 1000 meters. In some embodiments, the area defined as the vicinity of the vehicle may be irregularly shaped, such that it extends for different distances in different directions; the vicinity in the forward direction as defined by the vehicle's travel may, for example, extend for several hundred meters, while the vicinity in the backward or sideways directions may only extend, for example, for several dozen meters or less. The defined vicinity of the vehicle may, in some embodiments, be varied dynamically according to the information captured by the one or more image capture devices, such that the vicinity may vary according to, for example, what parts of a roadway are visible in the FOV of the image capture devices. The vicinity of the vehicle may, in some embodiments, be dynamically varied according to, for example, any perceptible condition or state of the roadway or vehicle, including vehicle speed, posted speed limit, roadway conditions, roadway congestion, roadway size, visibility distance, environment brightness, time of day, presence of other vehicles, presence of pedestrians, or any other suitable factor.

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
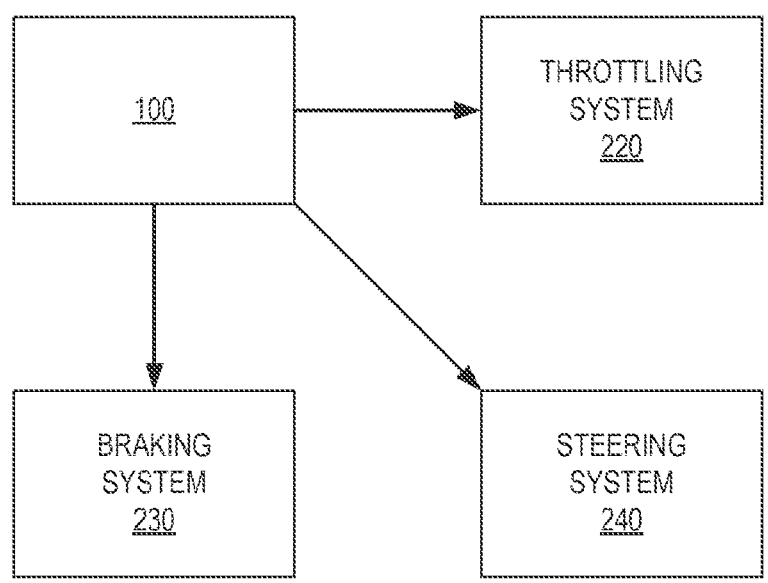
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 240 indicating operating conditions of vehicle 200 (e.g., speed, whether vehicle 200 is braking and/or turning, etc.). Further details are provided in connection with FIGS. 4-7, below.

Figure 3A:
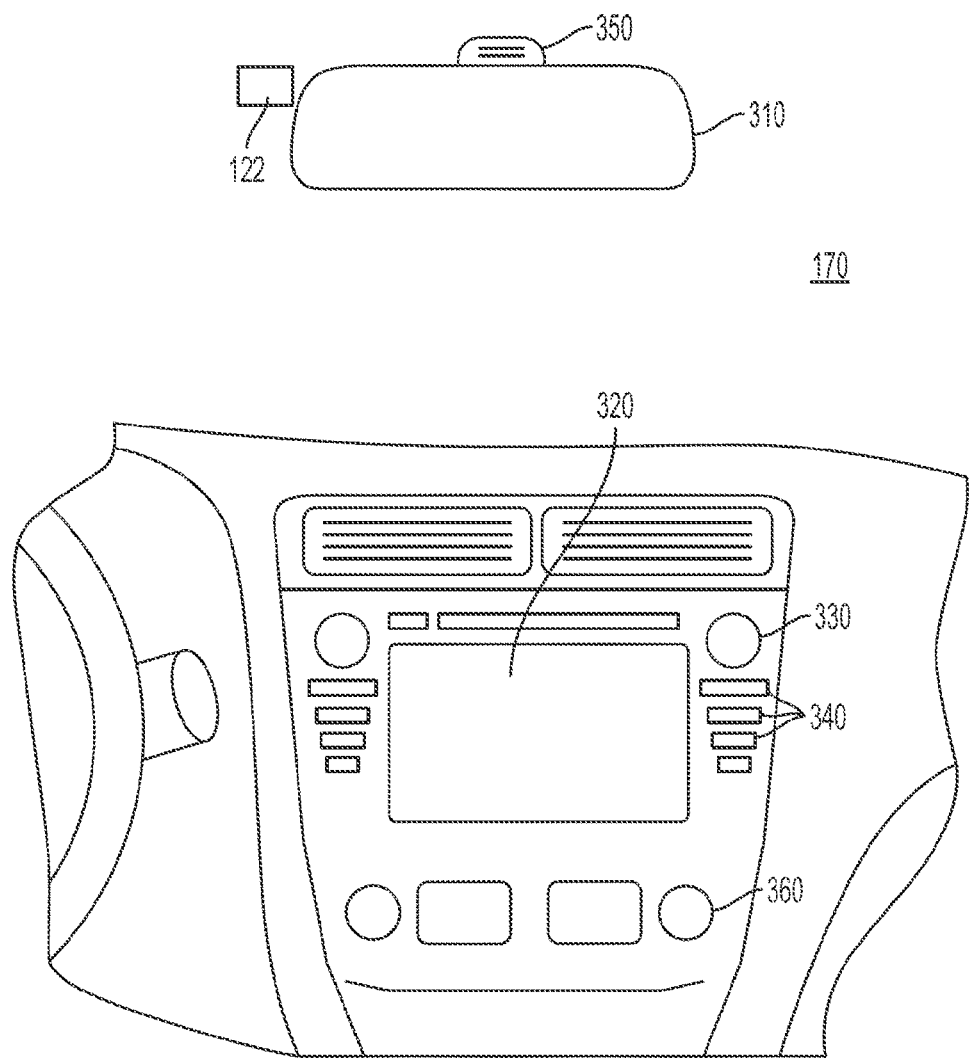
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
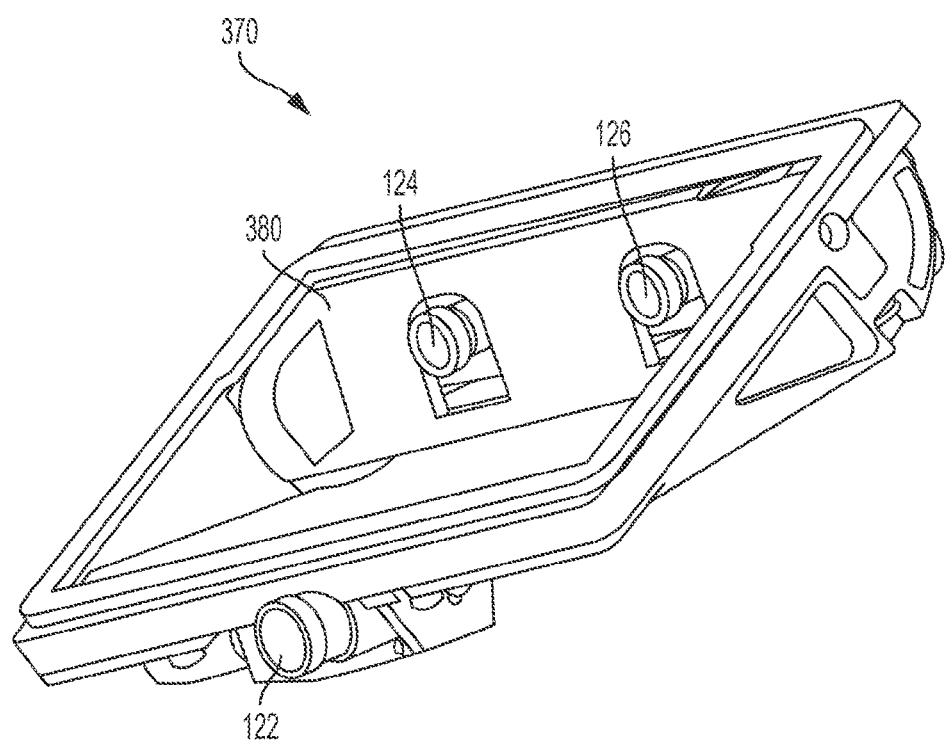
FIG. 3B is an illustration of an example of a camera mount that is configured to be positioned behind a rearview mirror and against a vehicle windshield consistent with the disclosed embodiments.
Figure 3C:
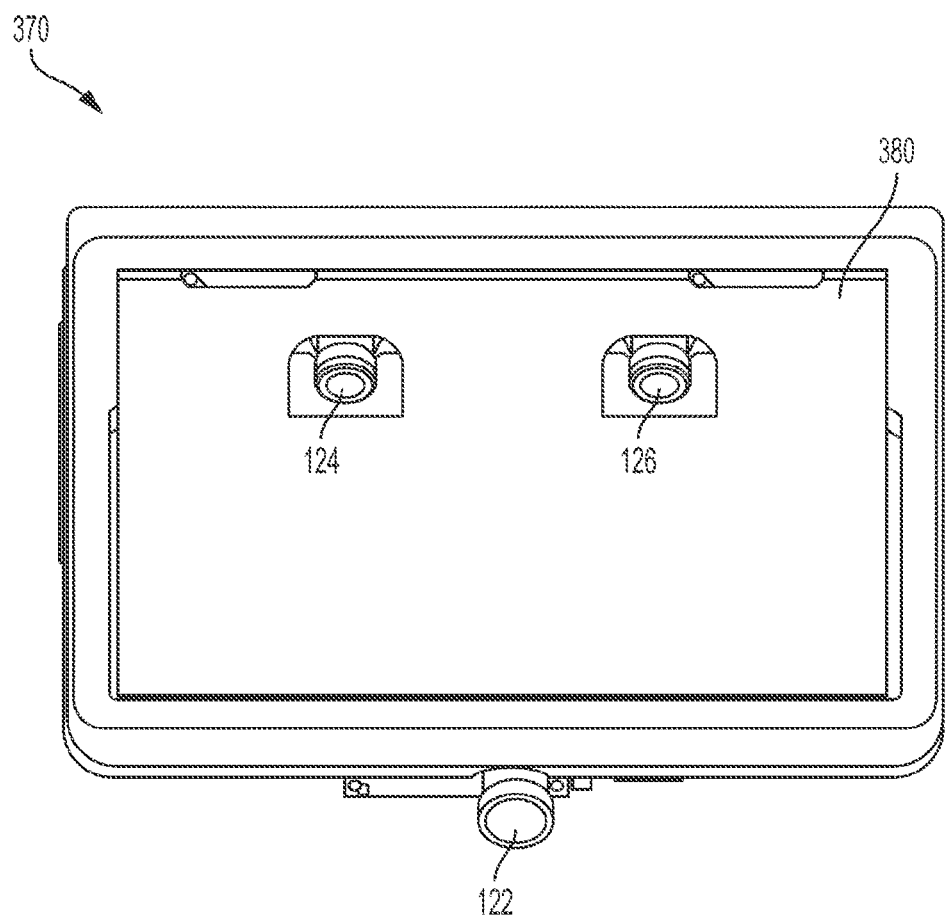
FIG. 3C is an illustration of the camera mount shown in FIG. 3B from a different perspective consistent with the disclosed embodiments.
Figure 3D:
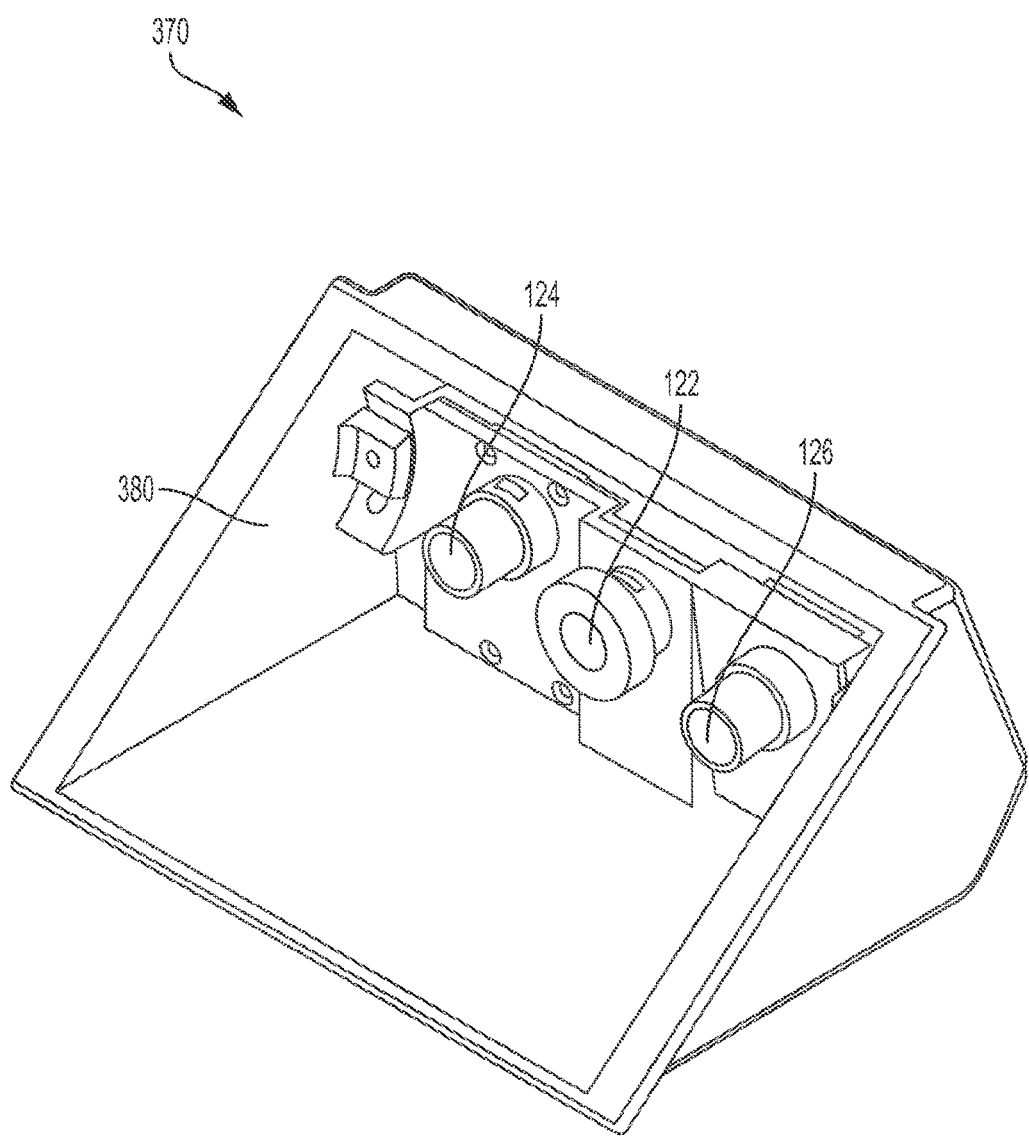
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and, in response to this analysis, navigate and/or otherwise control and/or operate vehicle 200. Navigation, control, and/or operation of vehicle 200 may include enabling and/or disabling (directly or via intermediary controllers, such as the controllers mentioned above) various features, components, devices, modes, systems, and/or subsystems associated with vehicle 200. Navigation, control, and/or operation may alternately or additionally include interaction with a user, driver, passenger, passerby, and/or other vehicle or user, which may be located inside or outside vehicle 200, for example by providing visual, audio, haptic, and/or other sensory alerts and/or indications.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings, indications, recommendations, alerts, or instructions to a driver, passenger, user, or other person inside or outside of the vehicle (or to other vehicles) based on the analysis of the collected data.

Further, consistent with disclosed embodiments, the functionality provided by system 100 may cause vehicle 200 to take different actions to navigate vehicle 200 within a lane and/or relative to other vehicles and/or objects. For example, system 100 may adjust the positioning of vehicle 200 relative to a lane within which vehicle 200 is traveling and/or relative to objects positioned near vehicle 200, select a particular lane for vehicle 200 to use while traveling, and take action in response to an encroaching vehicle, such as a vehicle attempting to move into the lane within which vehicle 200 is traveling. Additionally, system 100 may control the speed of vehicle 200 in different scenarios, such as when vehicle 200 is making a turn. System 100 may cause vehicle 200 to mimic the actions of a leading vehicle or monitor a target vehicle and navigate vehicle 200 so that it passes the target vehicle. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data (e.g., a depth map) or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images or with the depth information obtained by stereo processing.

The third processing device may receive images from the wide FOV camera and process the images to detect vehicles, pedestrians, lane marks, traffic signs, traffic lights, and other road objects. The third processing device may execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
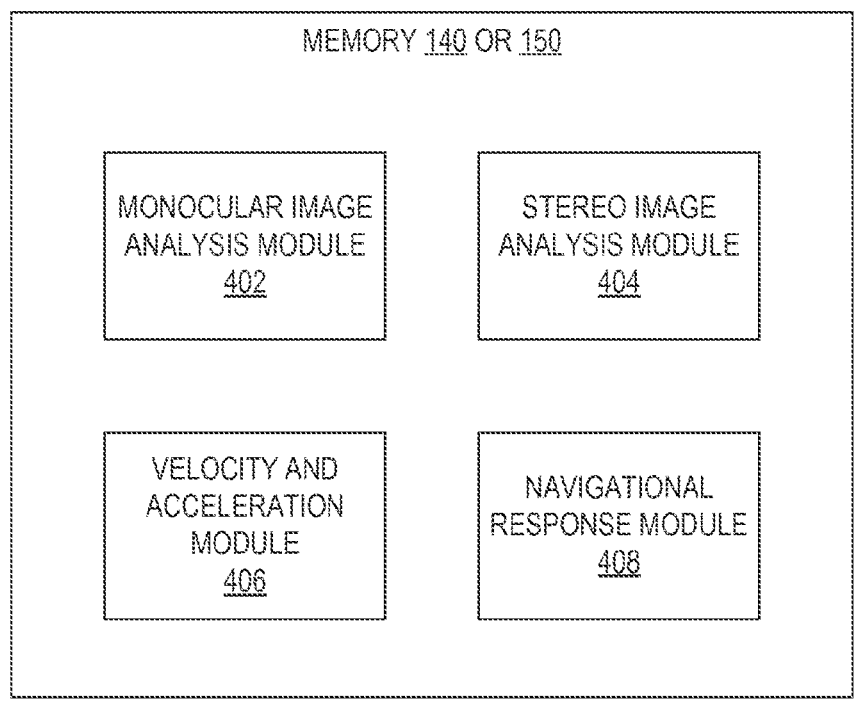
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402-408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. In some embodiments, an environment of a vehicle may include, for any given frame, the area or space covered by any one or by any combination of the imaging devices (the FOV of the imaging devices). Based on the analysis, system 100 (e.g., via processing unit 110) may cause one or more navigational responses in vehicle 200, such as a turn, a lane shift, a change in acceleration, and the like, as discussed below in connection with navigational response module 408. Furthermore, based on the analysis, system 100 (e.g., via processing unit 110) may cause one or more navigational and/or vehicle control responses, including but not limited to the various manners of controlling vehicle 200 and any associated systems and/or subsystems discussed above. In some embodiments, any or all of the responses or actions mentioned above may be referred to, for simplicity, as a navigational action or a navigational response.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Figure 5A:
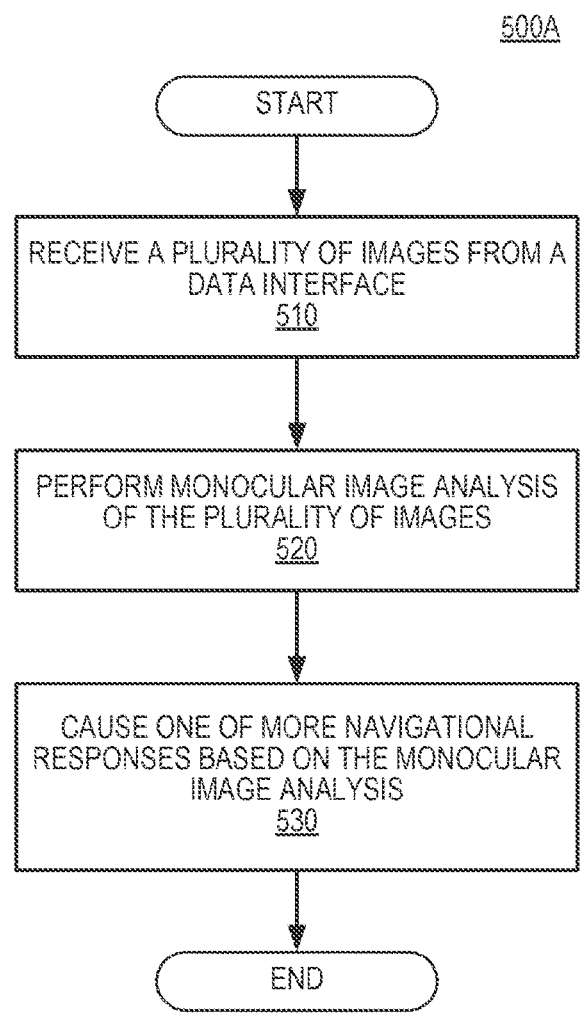
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road or of certain areas of the road (e.g., within a region of interest defined around image data which is suspected to show a road hazard). Processing unit 110 may then use the 3D-map to detect road hazards. For example, segmentation techniques and classification techniques can be used to detect the road surface, as well as hazards existing above the road surface. For example, as explained in additional detail below, a system may detect features of a road surface such as painted lane lines or lane markings, and may additionally detect features of a roadway existing above the road surface, such as cones/barrels/poles/barriers in a construction zone, guard rails, other vehicles, road signs, and the like.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
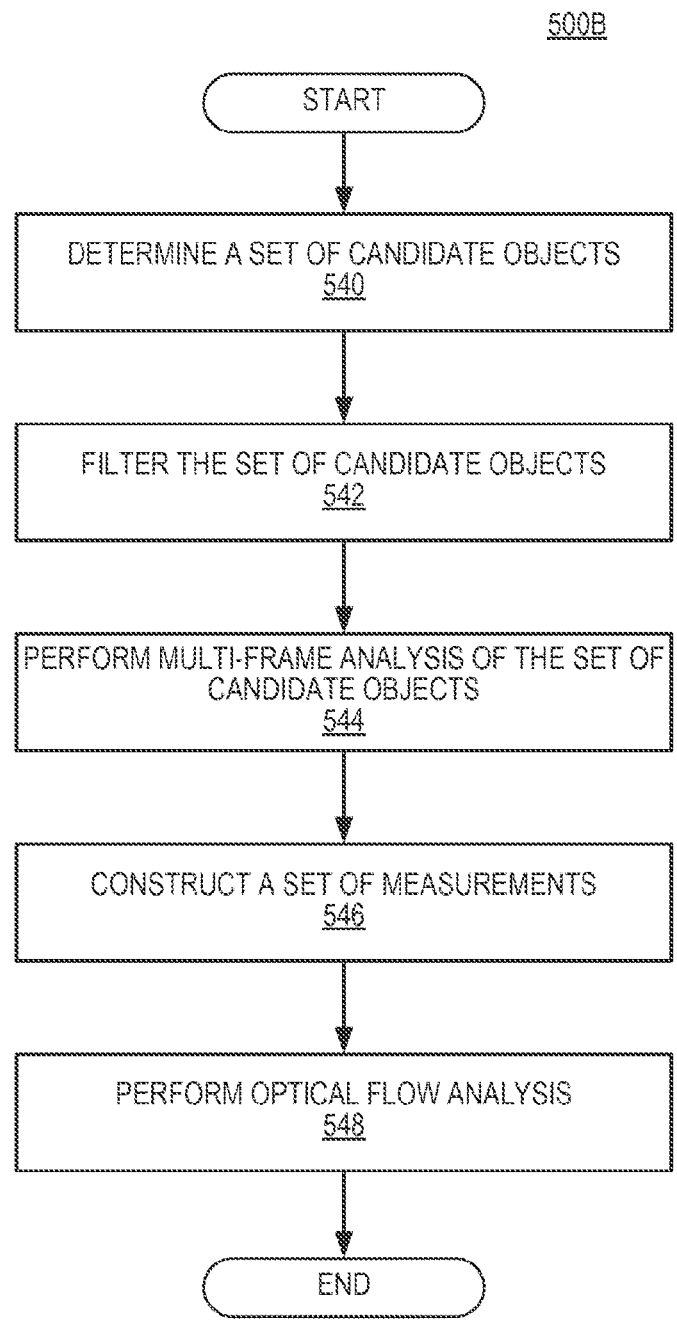
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, size, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
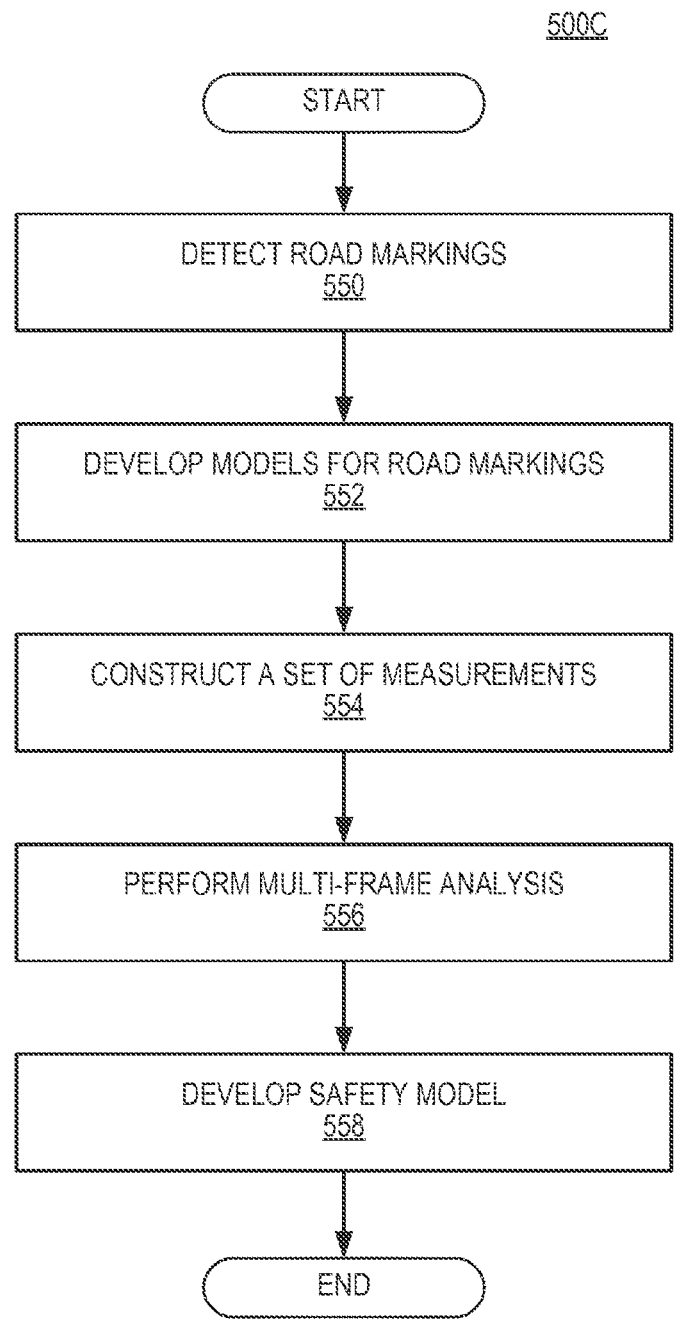
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
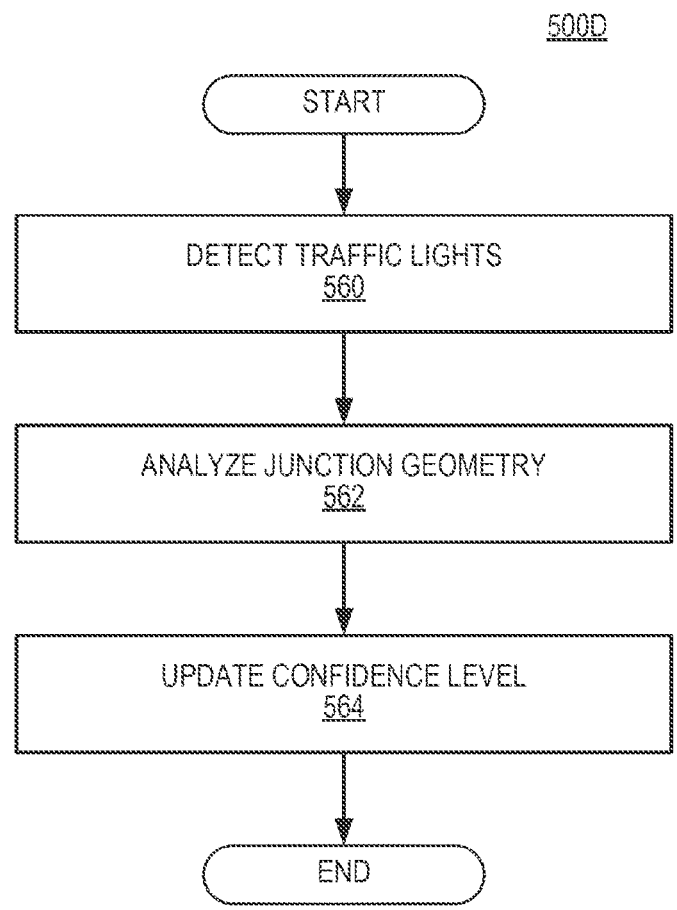
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
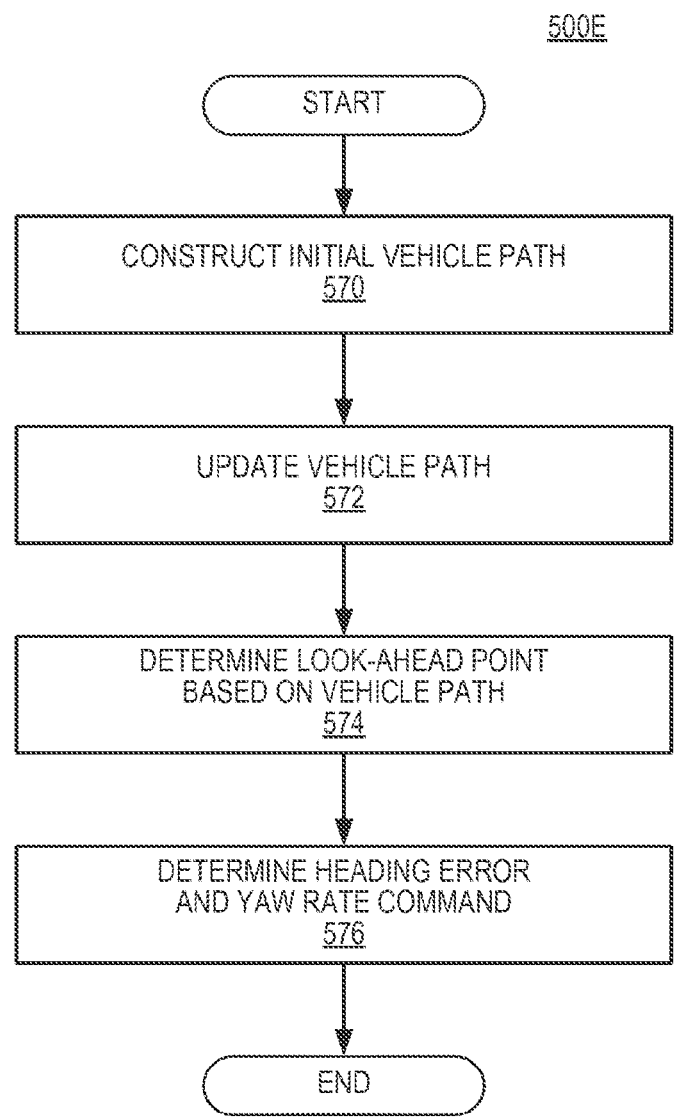
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and, in some embodiments, the distance $d_i$ between two points in the set of points may fall in the range of 1 to 5 meters, or in further examples, a timing measure can be used to provide the set of points, whereby the points in the set of points are 0.5 second to 5 seconds apart from one another (e.g., 1.5 seconds apart). In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_1, z_1)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_1/z_1)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
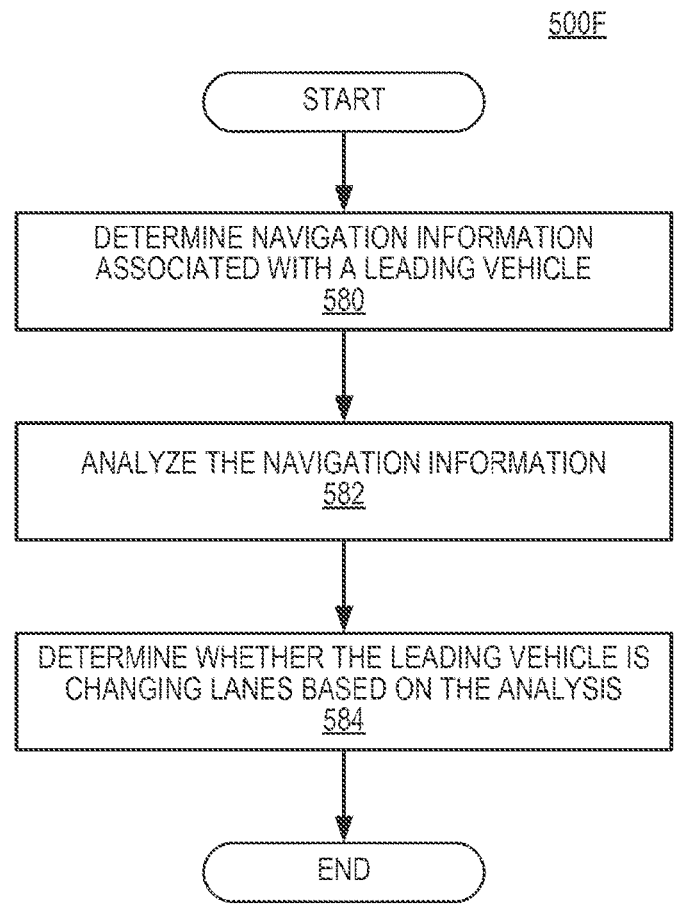
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
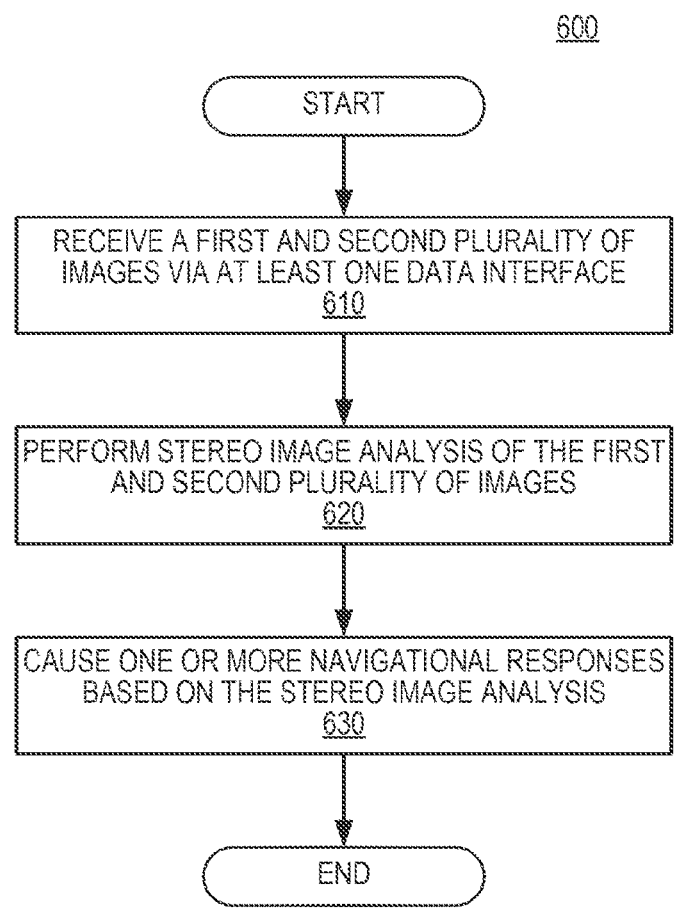
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
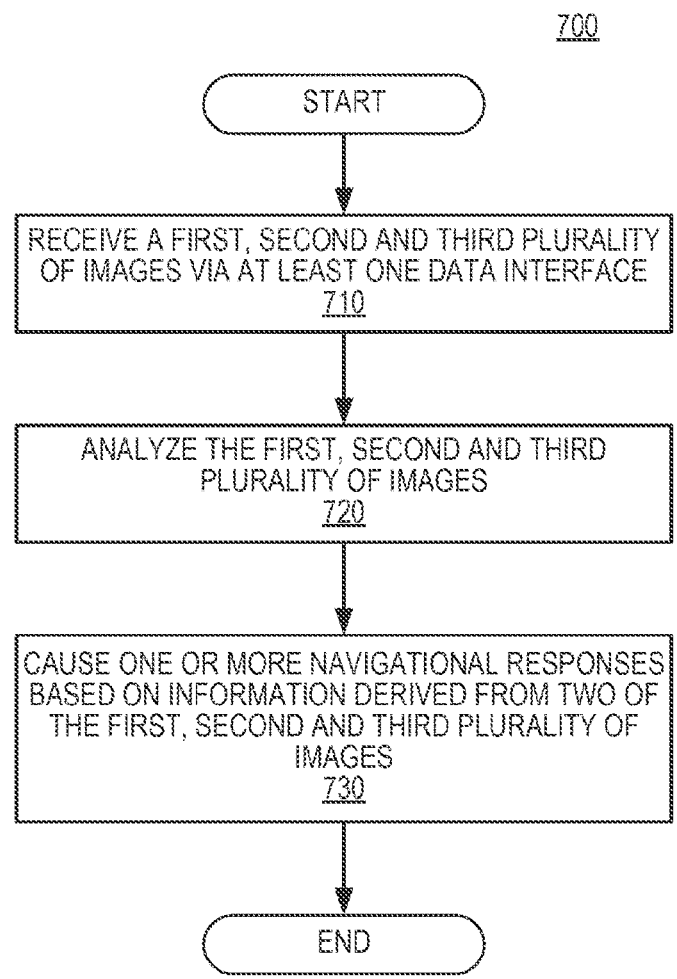
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Lane Constraint Prediction

System 100 may provide vehicle 200 with lane constraint prediction techniques, such that the system predicts the location of one or more lane constraints.

In some embodiments, lane constraint prediction may be understood as one or more techniques for predicting the location of a lane constraint. A lane constraint, in some embodiments, may be defined as the boundary at the edge of a lane, roadway, parking space, or other path or space in which a vehicle should be caused to travel. In some situations, a lane constraint may be marked on a roadway, such as by painted lines, a physical barrier, Botts' dots, or one or more additional indicators. In some embodiments, a lane constraint may be defined by the edge of a roadway, a curb, a guard-rail, or the like. In some embodiments, a lane constraint may be defined by one or more other vehicles, such as a row of parallel-parked vehicles adjacent to the lane, or a row of parked vehicles in a parking lot. In some embodiments, a lane constraint may be unmarked, such as on an unmarked roadway or in a parking lot without lane lines.

In some embodiments, a self-driving or driver-assist system may use image capture devices and image analysis to determine the location of one or more lane constraints based on objects detected in the images, such as lane markings, edges of roadways, and/or other vehicles. In most driving situations, the system may be able to detect at least two lane constraints—one on each side of the lane in which the vehicle is traveling—based on the visible characteristics (e.g., lane lines, etc.) of the captured images.

In certain situations, however, including those in which only one lane constraint on one side of a lane or on one side of vehicle 200 can be sufficiently detected based on visible characteristics in the captured images (e.g., lane lines, etc.), system 100 may predict the position of a lane constraint on the other side of the lane or on the other side of the vehicle, allowing the vehicle to continue to travel within a lane defined by the detected constraint and the predicted constraint opposite it.

In some embodiments, lane constraint prediction may be performed by system 100 subject to one or more conditions being satisfied. For example, in some embodiments, system 100 predicts the location of a lane constraint when a previously-detected lane constraint ceases to be detected as vehicle 200 progresses along a roadway. Thus, in some embodiments if a lane marking or other detected lane constraint suddenly ends or becomes undetectable, then lane constraint prediction may be performed. In other examples, system 100 predicts the location of a lane constraint when the system determines that guard-rail shadow conditions are present, such that a guard rail is present in the vicinity of the roadway or a guardrail is casting a shadow onto the roadway.

In some embodiments, system 100 may only perform lane constraint prediction when system 100 has access to valid and sufficient historical information about the width of a lane in which vehicle 200 is traveling; in situations in which a lane constraint on one side of vehicle 200 is newly detected as vehicle 200 progresses along a roadway, system 100 may in some embodiments refrain from performing lane constraint prediction.

In some embodiments, lane constraint prediction may be performed for a maximum travel distance, such that, if vehicle 200 travels greater than a predefined maximum travel distance while system 100 is continuously performing lane constraint prediction, then lane constraint prediction may then be ceased. In some embodiments, the predefined maximum travel distance may be set or modified in accordance with one or more various factors detected by system 100. In some embodiments, the predefined maximum travel distance may be turned off (e.g., it may be functionally set to "infinite") in accordance with one or more various factors detected by system 100.

In some embodiments, lane constraint prediction may be ceased in accordance with various cancellation conditions detected by system 100. For example, in some embodiments, if a driver of vehicle 200 changes lanes, then lane constraint prediction may be ceased. In some embodiments, if vehicle 200 is traversing a curve in the roadway that exceeds a predefined curve sharpness threshold, then lane constraint prediction may be ceased.

Figure 8A:
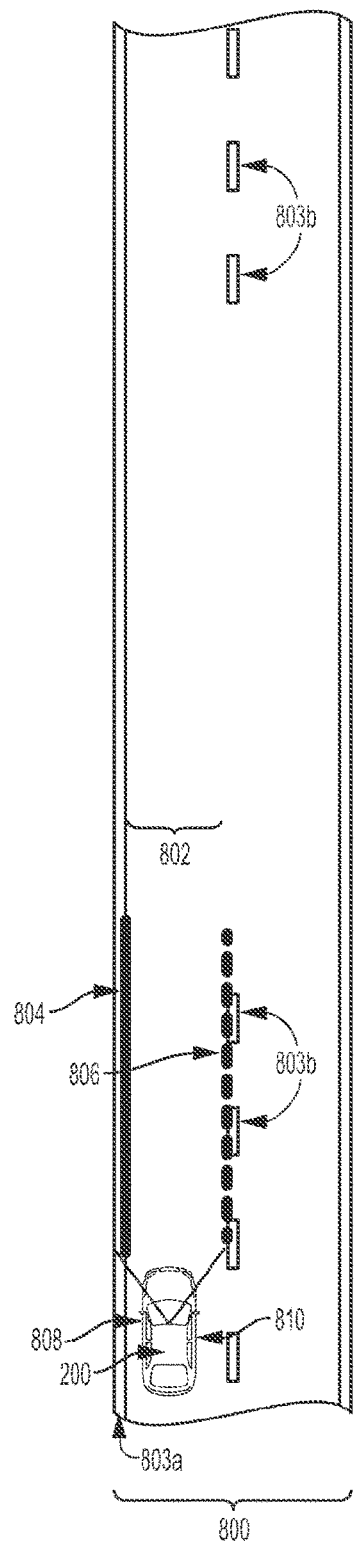
FIGS. 8A-8C are depictions of a vehicle traveling along a roadway in accordance with some embodiments.
Figure 8B:
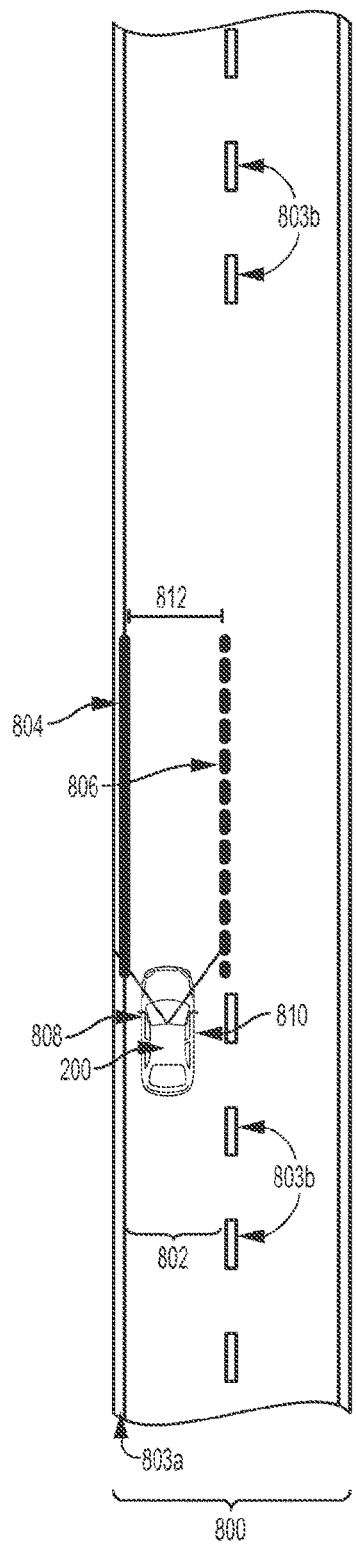
Figure 8C:
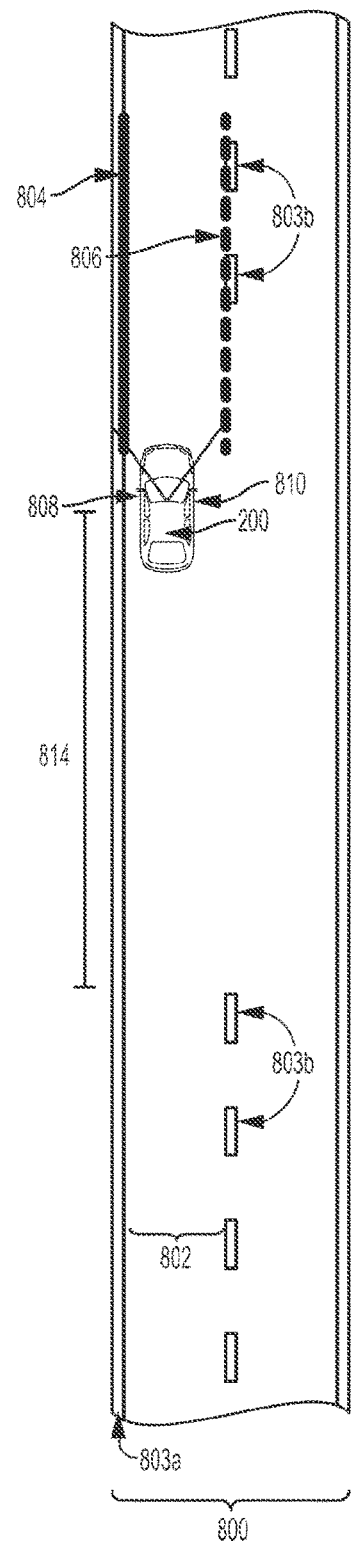

FIGS. 8A-8C illustrate an embodiment in which vehicle 200 travels on a roadway 800. In some embodiments, vehicle 200 may have one or more fields of vision provided by one or more image capture devices or cameras, such as image capture devices 122, 124, and/or 126. In the depicted example, vehicle 200 may have a field of vision facing frontward from the vehicle, as depicted by the angled lines forming an upward-opening triangle in front of vehicle 200; in some embodiments, vehicle 200 may have one or more fields of vision facing in multiple different directions from vehicle 200. In the depicted example, the disclosed systems and methods for lane constraint prediction (e.g., predicting the location of a lane constraint when one is not detected) and operating vehicle 200 within a lane defined by a predicted lane constraint may be used. As shown, roadway 800 may have lane 802 in which vehicle 200 is traveling. Lane 802 may be defined on a first side by first lane constraint 804 and on a second side, opposite the first side, by lane constraint 806. These lane constraints 804 and 806 may be detected by system 100, as indicated by the bolded lines showing lane constraints 804 and 806. Vehicle 200 may have a first vehicle side 808 on the same side of vehicle 200 as first lane constraint 804, and a second vehicle side 810 on the same side of vehicle 200 as second lane constraint 806.

Processing unit 110 may be configured to determine first lane constraint 804 and second lane constraint 806 based on a plurality of images acquired by image capture device 122-126 that processing unit 110 may receive via data interface 128. According to some embodiments, first lane constraint 804 and/or second lane constraint 806 may be identified by visible lane boundaries, such as dashed or solid lines marked on a road surface, such as lane lines 803a (solid line) and 803b (dashed line). Additionally or alternatively, first lane constraint 804 and/or second lane constraint 806 may be identified by an edge of a road surface or a barrier. Additionally or alternatively, first lane constraint 804 and/or second lane constraint 806 may be identified by markers (e.g., Botts' dots). According to some embodiments, processing unit 110 may determine first lane constraint 804 and/or second lane constraint 806 by identifying a midpoint of a road surface width. According to some embodiments, if processing unit 110 identifies only first lane constraint 804, processing unit 110 may estimate second lane constraint 806, such as based on an estimated lane width or road width.

Processing unit 110 may predict lane constraints in this manner when, for example, lines designating road lanes are not painted or otherwise labeled.

In FIGS. 8A-8C, lane constraints 804 and 806 are marked on roadway 800 by solid and dashed lines 803a and 803b, respectively. In a portion of roadway 800 toward the center of FIGS. 8A-8C, dashed line 803b corresponding to lane constraint 806 is not painted on roadway 800. In FIGS. 8A-8C, the detection of lane constraints 804 and 806 by system 100 is depicted by the bolded lines that overlay the respective lane lines in front of vehicle 200. As depicted by the bolded lines in FIG. 8A, system 100 detects lane constraint 804 as a solid-line lane constraint on the left side of vehicle 200 for a certain visible distance in front of vehicle 200. Similarly, system 100 detects lane constraint 806 as a dashed-line lane constraint on the right side of vehicle 200 for a certain visible distance in front of vehicle 200. In accordance with the detection of lane constraints 804 and 806, system 100 causes vehicle 200 to travel inside lane 802 as defined by lane constraints 804 and 806.

FIG. 8B depicts vehicle 200 continuing to progress along roadway 800 in lane 802 following the point in time depicted in FIG. 8A. As vehicle 200 reaches the portion of roadway 800 at which dashed line 803b is not painted on roadway 800, lane constraint prediction may be performed by system 100. As shown, system 100 predicts the location of lane constraint 806 as being located a distance 812 from opposite lane constraint 804. This distance 812 may be determined, in some embodiments, based on the historical information detected and stored by system 100 about the previous widths of lane 802 and/or the average historical width of lanes in general. As shown, system 100 predicts that lane constraint 806 continues to be a dashed lane constraint, based on the fact that lane constraint 806 was marked by dashed lane line 803b at the last time that lane constraint 806 was detected by system 100 before lane constraint prediction was activated. In accordance with the continued detection of lane constraint 804 and the prediction of lane constraint 806, system 100 causes vehicle 200 to continue to travel inside lane 802 as defined by lane constraints 804 and 806. In some embodiments, when lane constraint prediction is activated, and possibly under certain circumstances (e.g., there are other vehicles nearby), a certain default type of lane constraint is used to control the motion of the vehicle which is not necessarily the same as the last lane constraint that was detected previous to the activation of the lane constraint prediction. For example, in some embodiments, a system may default to predicting solid-line lane constraints rather than dashed-line lane constraints.

FIG. 8C depicts vehicle 200 continuing to progress along roadway 800 in lane 802 following the point in time depicted in FIG. 8B. As vehicle 200 reaches the portion of roadway 800 at which dashed line 803b is once again painted on roadway 800, lane constraint prediction may cease to be performed by system 100, as lane constraint 806 is once again detected (rather than predicted) as a dashed lane constraint by system 100. As depicted in FIG. 8C, vehicle 200 has traveled distance 814 while performing lane constraint prediction. In some embodiments, lane constraint prediction may only be performed continuously or substantially continuously for a predefined maximum distance (and/or predefined maximum time). In the depicted example of FIG. 8C, distance 814 is less than the predefined maximum distance for performing lane constraint prediction, such that lane constraint prediction was able to be performed continuously as vehicle 200 traversed the distance between its position in FIG. 8B and its position in FIG. 8C. In some embodiments, the predefined maximum distance for performing lane constraint prediction may be set to a default of 18 meters. In some embodiments, the predefined maximum distance may be varied by vehicle manufacturers, drivers, and/or any other party.

Figure 9A:
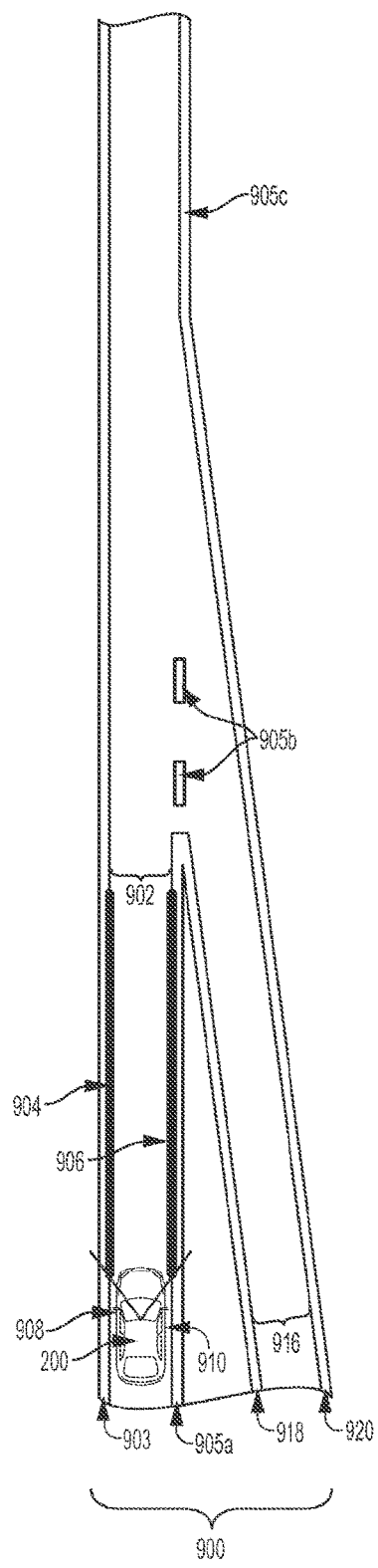
FIGS. 9A-9C are depictions of a vehicle traveling along a roadway in accordance with some embodiments.
Figure 9B:
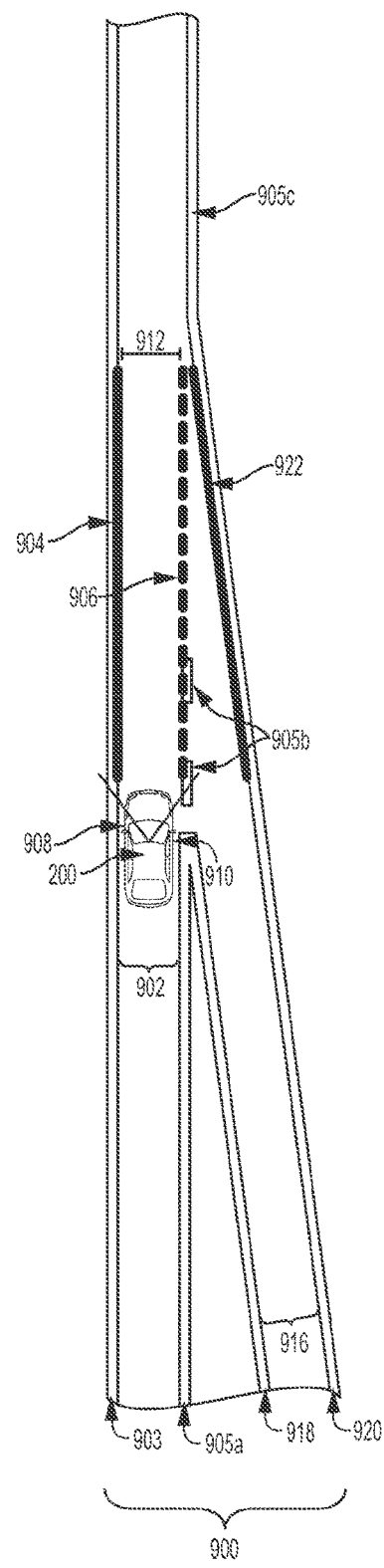
Figure 9C:
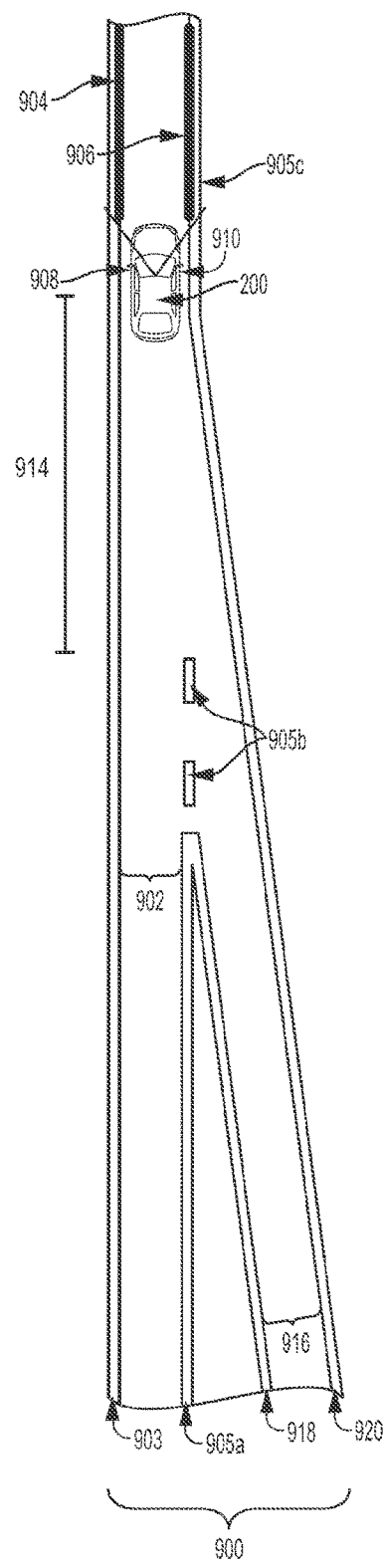

FIGS. 9A-9C illustrate an embodiment in which vehicle 200 travels on a roadway 900. In the depicted example, the disclosed systems and methods for lane constraint prediction (e.g., predicting the location of a lane constraint when one is not detected) and operating vehicle 200 within a lane defined by a predicted lane constraint may be used. The example depicted in FIGS. 9A-9C differs from the example depicted in FIGS. 8A-8C at least in that, on roadway 900, two lanes are merging into one lane. As explained in greater detail below, in some embodiments, lane constraint prediction may be performed when two lanes are merging into one lane and lane lines are not detected on the side of the lane into which a second lane is merging.

As shown, roadway 900 may have lane 902 in which vehicle 200 is traveling. Lane 902 may be defined on a first side by first lane constraint 904 and on a second side, opposite the first side, by lane constraint 906. These lane constraints 904 and 906 may be detected by system 100, as indicated by the bolded lines showing lane constraints 904 and 906. Vehicle 200 may have a first vehicle side 908 on the same side of vehicle 200 as first lane constraint 904, and a second vehicle side 910 on the same side of vehicle 200 as second lane constraint 906.

Processing unit 110 may be configured to determine first lane constraint 904 and second lane constraint 906 based on a plurality of images acquired by image capture device 122-126 that processing unit 110 may receive via data interface 128. According to some embodiments, first lane constraint 904 and/or second lane constraint 906 may be identified, detected, estimated, or predicted in any or all of the manners discussed above with respect to FIGS. 8A-8C.

As shown, roadway 900 may have lane 916. Lane 916 may be bounded by lane constraints. In the example shown, lane 916 is marked by solid lane line 918 on its left side and solid lane line 120 on its right side. In the example shown, lane 916 merges into lane 902 as roadway 900 continues in the direction of travel of vehicle 200.

In FIGS. 9A-9C, lane constraint 904 is continuously marked by solid line 903 on roadway 900. Lane constraint 906, on the other hand, is inconsistently marked; at the bottom-most portion of the figures, lane constraint 906 is marked by solid line 905a on roadway 900; at the portion above that, as lane 916 begins to merge into lane 902, lane constraint 906 is marked by dashed line 905b on roadway 900; at the portion above that, as lane 916 finishes merging into lane 902, lane constraint 906 is not marked; finally, at the top-most portion of the figures, lane constraint 906 is again marked by a solid line, this time by solid line 905c on roadway 900.

In FIGS. 9A-9C, the detection of lane constraints 904, 906, and 922 by system 100 is depicted by the bolded lines that overlay the respective lane lines in front of vehicle 200. As depicted by the bolded lines in FIG. 9A, system 100 detects lane constraint 904 as a solid-line lane constraint on the left side of vehicle 200 for a certain visible distance in front of vehicle 200. Similarly, system 100 detects lane constraint 906 as a solid lane constraint on the right side of vehicle 200 for a certain visible distance in front of vehicle 200. In accordance with the detection of lane constraints 904 and 906, system 100 causes vehicle 200 to travel inside lane 902 as defined by lane constraints 904 and 906.

FIG. 9B depicts vehicle 200 continuing to progress along roadway 900 in lane 902 following the point in time depicted in FIG. 9A. As vehicle 200 reaches the portion of roadway 900 at which lane 916 merges into lane 902 from the right side, where lane constraint 906 is marked briefly by dashed line 905b and then is not marked by any lines, lane constraint prediction may be performed by system 100. As shown, system 100 predicts the location of lane constraint 906 as being located a distance 912 from opposite lane constraint 904. This distance 912 may be determined, in some embodiments, based on the historical information detected and stored by system 100 about the previous widths of lane 902 and/or the average historical width of lanes in general. As shown, system 100 predicts that lane constraint 906 continues to be a dashed lane constraint, based on the fact that lane constraint 906 was marked by dashed line 905b at the last time that lane constraint 906 was detected by system 100 before lane constraint prediction was activated. In accordance with the continued detection of lane constraint 904 and the prediction of lane constraint 906, system 100 causes vehicle 200 to continue to travel inside lane 902 as defined by lane constraints 904 and 906.

Also shown in FIG. 9B is system 100 detecting lane constraint 922, which bounds the right side of lane 916, as lane 916 merges into lane 902. System 100 detects lane constraint 922 as a solid lane constraint based on the corresponding solid line 920 on roadway 900. In some embodiments, system 100 may determine that detected lane constraint 922 is not a constraint of lane 902 in which vehicle 200 is traveling, but rather is a lane constraint of a lane that is merging into lane 902. This determination may be made, in some embodiments, in accordance with a determination lane constraint 922 is detected as approaching lane 902 at above a threshold rate of approach. For example, if a detected lane constraint outside a constraint of a lane in which the vehicle is traveling makes an angle that is more than a predefined threshold angle above parallel with a detected or previously detected lane constraint of the lane in which the vehicle is travelling, then the outside lane constraint may be determined to correspond to an approaching merging lane.

In some embodiments, the determination that a lane is merging into another lane may be made in accordance with the detection and analysis of other aspects, characteristics, or objects in the roadway in or around a vehicle. For example, a second vehicle (e.g., different from the vehicle in which the system is provided) may be detected and tracked, and the system may determine that the other vehicle is traveling at an angle to a lane on the roadway that is indicative of a lane in which the other vehicle is traveling merging into another lane. In some embodiments, the system may detect that the other vehicle is approaching a lane, from an area outside the lane, at above a threshold rate of approach. In some embodiments, the system may make such a determination about one or more other vehicles, and may accordingly determine that lanes around the one or more other vehicles are merging. In some embodiments, information about the one or more other vehicles may be received via the multiple images captured by cameras associated with the system; in some embodiments, alternatively or additionally, information about the one or more other vehicles may be received via any suitable form of electronic communication, such as communication transmitted from one or more of the one or more other vehicles.

In yet some other embodiments, the determination that lanes are merging may be made in accordance with historical information about lane configuration and/or layout, such as historical information about the lanes at or around the current location of the vehicle.

FIG. 9C depicts vehicle 200 continuing to progress along roadway 900 in lane 902 following FIG. 9B. As vehicle 200 reaches the portion of roadway 900 at which the merge of lane 916 into lane 902 has been completed, lane constraint 906 is once again marked by a solid lines on roadway 900, this time by solid line 905c, and lane constraint prediction may cease to be performed by system 100, as lane constraint 906 is once again detected (rather than predicted) as a solid lane constraint by system 100. In some embodiments, system 100 may determine that it is detecting a lane constraint of the lane in which vehicle 200 is located (rather than a lane constraint of a merging lane) by determining that the lane constraint is no longer approaching the vehicle (or the lane in which the vehicle is traveling) at above the predefined threshold rate of approach. In some embodiments, system 100 may determine that it is detecting a lane constraint of the lane in which the vehicle is located (rather than a lane constraint of a merging lane) by determining that the lane constraint is within a predefined threshold distance of the predicted location of the lane constraint, as predicted by lane constraint prediction.

As depicted in FIG. 9C, vehicle 200 has traveled distance 914 while performing lane constraint prediction. In some embodiments, lane constraint prediction may only be performed continuously or substantially continuously for a predefined maximum distance (and/or predefined maximum time). According to some embodiments, the maximum distance/time that is allocated for lane constraint predication can be set dynamically. For example, the maximum distance/time that is allocated for lane constraint predication can be adjusted according to the vehicle's surrounding, the speed of the vehicle, the topology of the road, the brightness or the environment, the weather, the density and/or proximity of other vehicles on the roadway, and/or any other road conditions or characteristics. In some embodiments, when it is determined that an approaching merging lane is present in the vicinity of vehicle 200, system 100 may permit lane constraint prediction to be executed for a greater total distance than it would otherwise be permitted to be executed. For example, while a default maximum distance may be 18 meters, the maximum distance in situations when an ongoing lane merge is detected may be 1000 meters. This difference may account for the fact that lane merges may take several hundred meters to be completed. In the depicted example of FIG. 8C, distance 914 is less than the predefined maximum distance for performing lane constraint prediction in a lane merge situation, such that lane constraint prediction was able to be performed continuously as vehicle 200 traversed the distance between its position in FIG. 9B and its position in FIG. 9C.

Figure 10A:
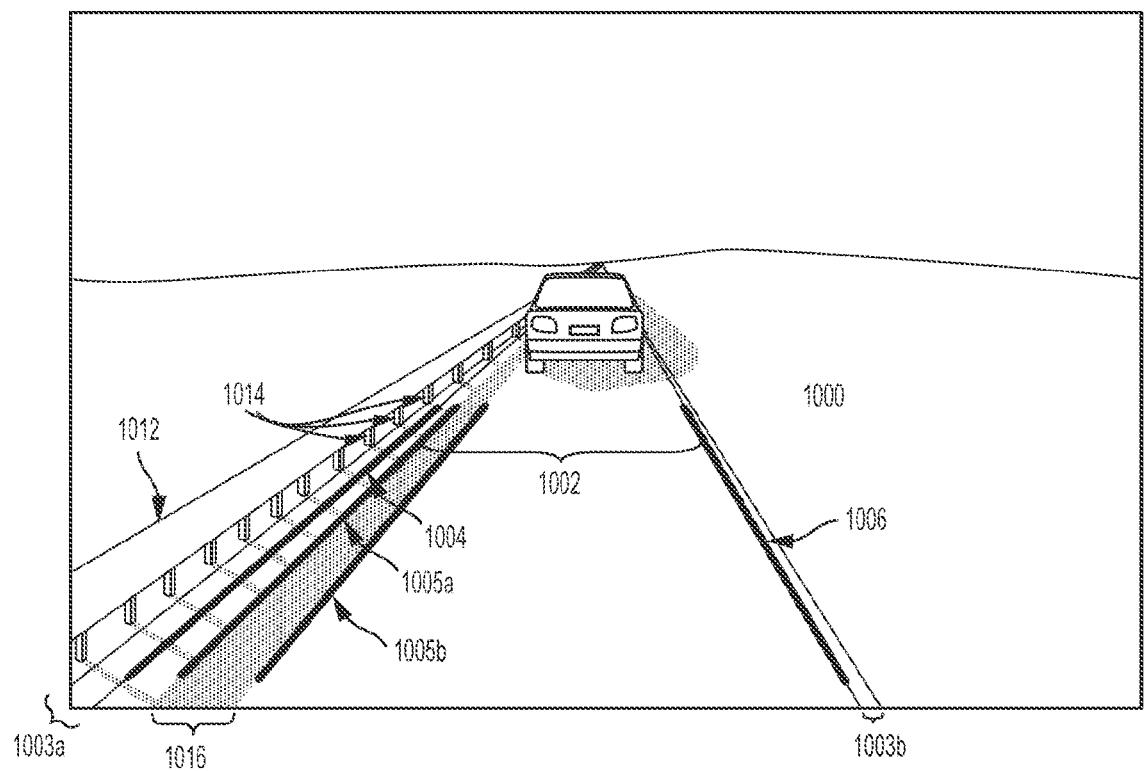
FIG. 10A is a depiction of a perspective view from a camera associated with a system in accordance with some embodiments.
Figure 10B:
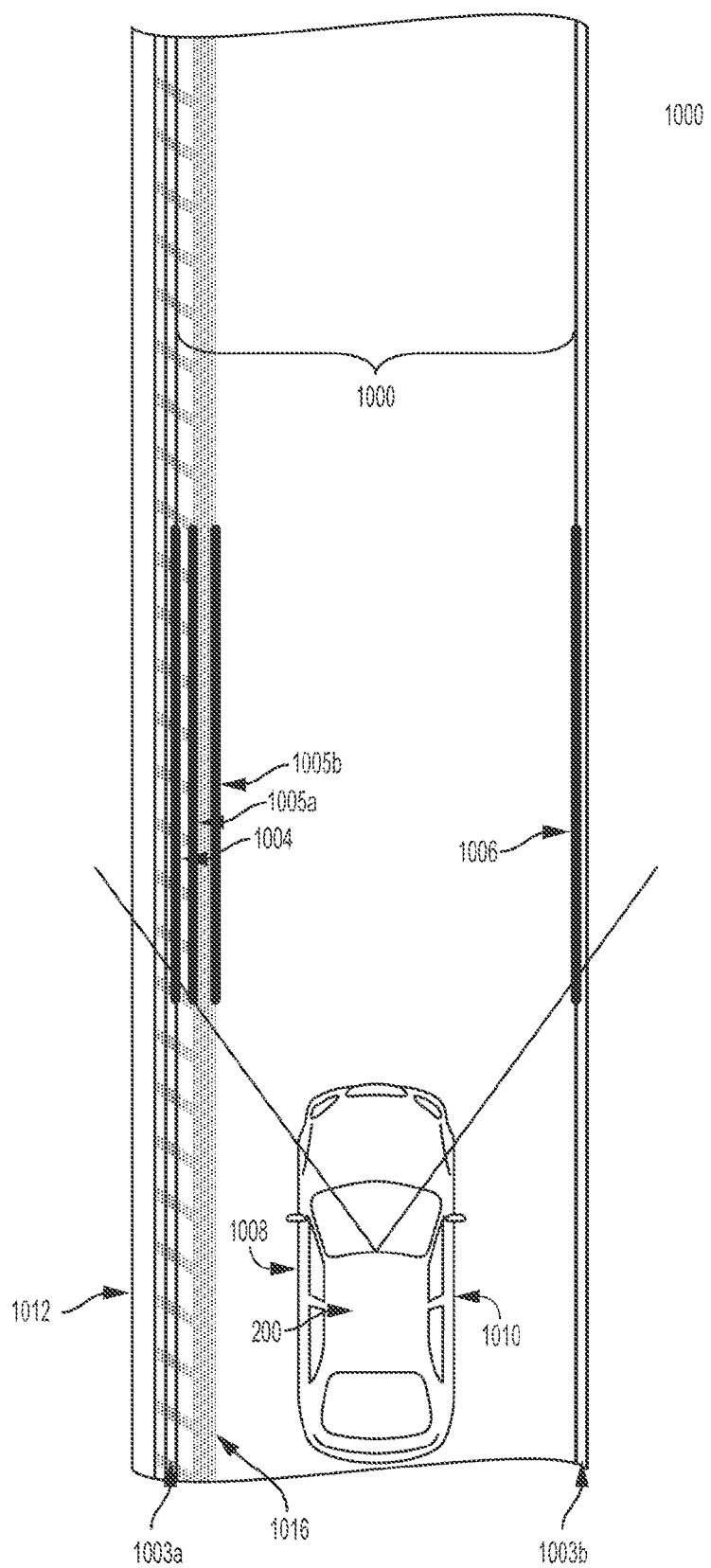
FIG. 10B is a depiction of a vehicle traveling along a roadway in accordance with some embodiments.

FIGS. 10A and 10B illustrate an embodiment in which vehicle 200 travels on roadway 1000. FIG. 10A shows a three-dimensional view as seen from the perspective of vehicle 200, such as one of the one or more images received by system 100 as vehicle 200 travels on roadway 1000. (FIG. 10A depicts a lead vehicle driving on roadway 1000 in front of vehicle 200, not to be confused with vehicle 200 itself.) FIG. 10B shows an overhead diagram of vehicle 200 on the same portion of roadway 1000.

In the depicted example, the disclosed systems and methods for lane constraint prediction (e.g., predicting the location of a lane constraint when guard rail shadow conditions are present) and operating vehicle 200 within a lane defined by a predicted lane constraint may be used. As shown, roadway 1000 may have lane 1002 in which vehicle 200 is traveling. Lane 1002 may be defined on a first side by first lane constraint 1004 and on a second side, opposite the first side, by lane constraint 1006. These lane constraints 1004 and 1006 may, in some embodiments, be detected by system 100, as indicated by the bolded lines showing lane constraints 1004 and 1006. Vehicle 200 may have a first vehicle side 1008 on the same side of vehicle 200 as first lane constraint 1004, and a second vehicle side 1010 on the same side of vehicle 200 as second lane constraint 1006.

Roadway 1000 may include lane lines 1003*a* and 1003*b*, which physically mark the left and right sides, respectively, of lane 1002 on roadway 1000.

Roadway 1000 may include guardrail 1012, which is supported by posts 1014. Both guard rail 1012 and its posts 1014 are casting guard rail shadow 1016, which in the depicted example falls over lane line 1003*a* and into lane 1002.

As depicted by the bolded lines in FIGS. 10A and 10B, system 100 detects lane constraint 1006 as a solid-line constraint on the right side of vehicle 200 for a certain visible distance in front of vehicle 200. On the left side of roadway 1000, the bolded lines show how system 1000 detects several edges, one of which is attributable to lane line 1003*a* and two of which (shadow edges 1005*a* and 1005*b*) are attributable to guard rail shadow 1016. In some embodiments, the detection of multiple edges on one side of a vehicle or lane may make it more difficult to identify a lane constraint from the images available to system 100, such that the lane constraint cannot be identified with a high level of certainty. Accordingly, in some embodiments, when system 100 determines that guard rail 1012 or guard rail posts 1014 are present, that guard rail shadow 1016 is being cast onto roadway 1000, or that multiple edges are detected on the same side of lane 1002, system 100 may determine that guard rail shadow conditions are present, and may accordingly engage a guard rail shadow mode. In some embodiment, a guard rail shadow mode may cause lane constraint prediction to be executed for the side of a lane that is proximate to the detected guard rail, shadow, or edges. By using lane constraint prediction, system 100 may predict the location of lane constraint 1004 in accordance with any of the techniques discussed above with respect to FIGS. 8A-8C and/or 9A-9C. In the depicted example, system 100 correctly predicts the location of lane constraint 1002 to coincide with the edge defined by painted lane line 1003*a*, rather than either of the edges defined by guard rail shadow 1016. In accordance with the detection of lane constraints 1004 and 1006, system 100 causes vehicle 200 to travel inside lane 1002 as defined by lane constraints 1004 and 1006.

In some embodiments, guard rail shadow prediction may cause lane constraint prediction to be engaged with no limitation as to how long lane constraint prediction can be carried out. Thus, for example, rather than the maximum distance for lane constraint prediction being set to 18 meters (as in the example of FIGS. 8A-8C) or 1000 meters (as in the example of FIGS. 9A-9C), system 100 may turn off the maximum distance, functionally configuring the system so that lane constraint prediction may continue for an indefinite distance (and/or an indefinite time) so long as guard-rail shadow conditions continue to be detected and so long as no lane constraint prediction cancellation conditions are detected.

Figure 11:
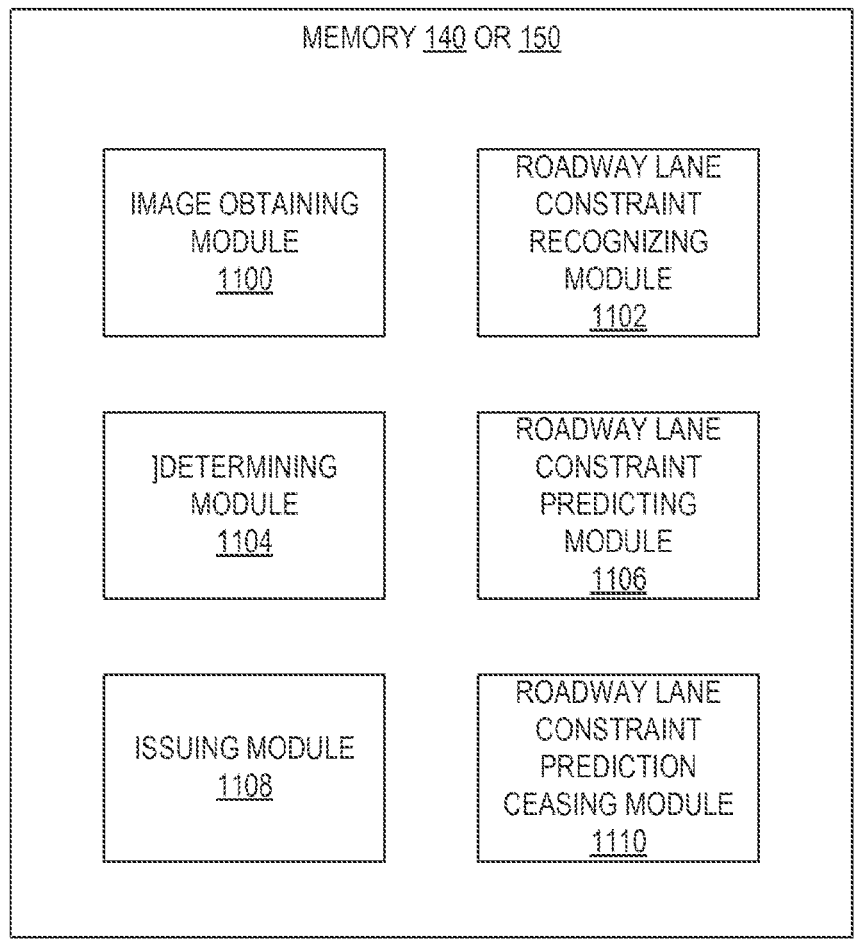
FIG. 11 is a diagrammatic representation of the memory of an exemplary system consistent with some disclosed embodiments.

FIG. 11 is an exemplary block diagram of memory 140 or 150, which may store instructions for performing one or more operations consistent with disclosed embodiments. As illustrated in FIG. 11, memory 140 or 150 may store one or more modules for performing the techniques described herein. For example, memory 140 or 150 may store image obtaining module 1100, roadway lane constraint recognizing module 1102, determining module 1104, roadway lane constraint predicting module 1106, vehicle enabling module 1108, and lane constraint prediction ceasing module 1110. As would be appreciated by a person of ordinary skill in the art, any of the previously recited modules may be combined with each other or with other modules, interfaced with one another or with other modules, and/or subdivided into further modules and/or sub-modules.

In some embodiments, processing unit 110 may execute instructions stored on the one or more modules in memory 140 or 150, and the execution by processing unit 110 may cause system 100 to perform the methods discussed herein.

In some embodiments, processing unit 110 may cause system 100 to obtain (e.g., with image obtaining module 1100) multiple images from a camera (e.g., image capture devices 122, 124, and/or 126), wherein the camera is adapted to capture, when mounted on a vehicle (e.g., vehicle 200) and while the vehicle is in motion, images of a roadway within a field of view of the camera, apply image processing to the multiple images to recognize (e.g., with roadway lane constraint recognizing module 1102) a first roadway lane constraint, determine (e.g., with determining module 1104), based on the multiple images, that one or more defined lane prediction conditions are satisfied, in accordance with the a determination that one or more defined lane prediction conditions are satisfied, predict (e.g., with roadway lane constraint predicting module 1106) the location of a second roadway lane constraint, and issue (e.g., with issuing module 1108) a notification or a control signal to control a motion of the vehicle according to the predicted location of the second roadway lane constraint.

In some embodiments, processing unit 110 may cause system 100 to issue (e.g., with issuing module 1108) a notification or a control signal to direct a motion of the vehicle according to a location of the first roadway lane constraint.

In some embodiments, processing unit 110 may cause system 100 to issue (e.g., with issuing module 1108) a notification or a control signal to direct a motion of the vehicle along a lane or an area between the first roadway lane constraint and the second roadway lane constrain.

In some embodiments, processing unit 110 may cause system 100 to determine (e.g., with determining module 1104) whether one or more defined lane prediction cancellation conditions are satisfied, and in accordance with a determination that one or more defined lane prediction cancellation conditions are satisfied, cease to predict (e.g., with lane constraint prediction ceasing module 1110) the location of the second roadway lane constraint.

Figure 12:
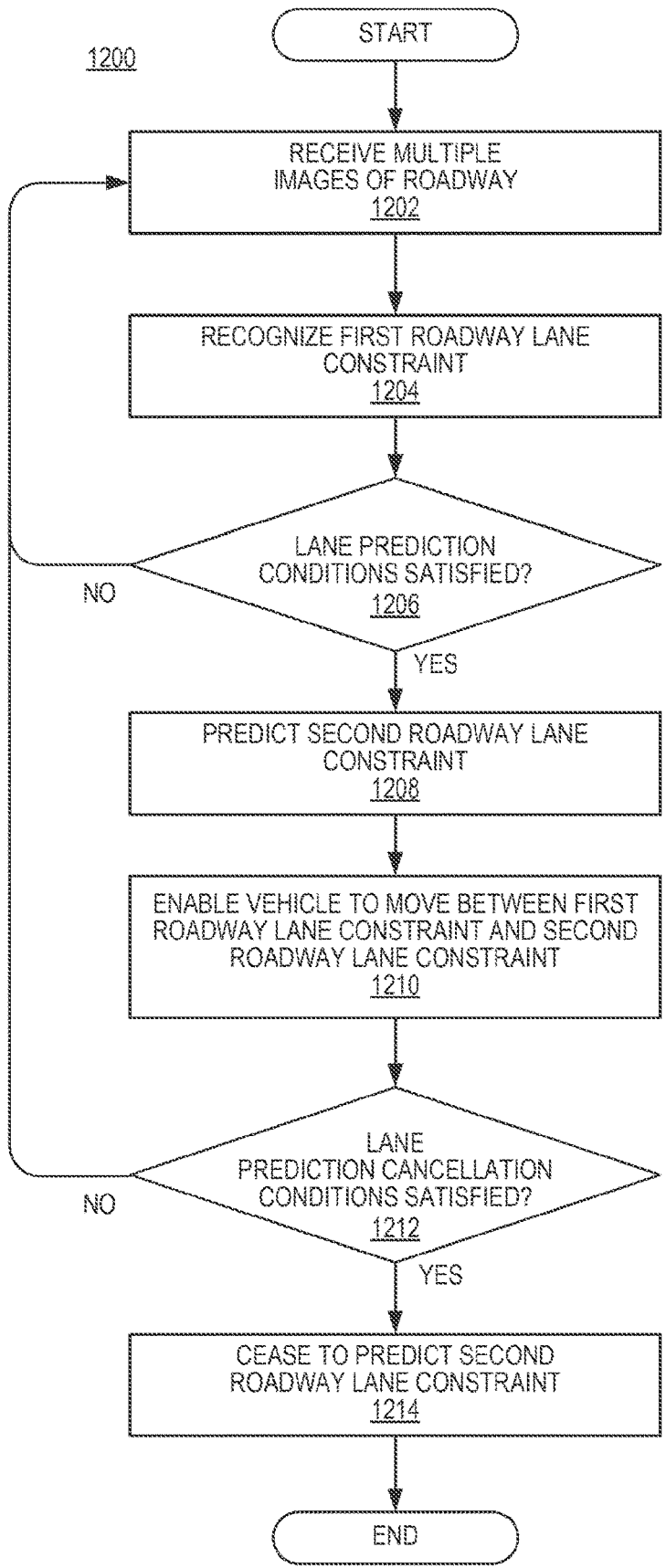
FIG. 12 is a flowchart of an exemplary process in accordance with some embodiments.

FIG. 12 illustrates a process 1200 for implementing lane constraint prediction consistent with the disclosed embodiments. In some embodiments, the steps in process 1200 may be illustrated by the situations illustrated in FIGS. 8A-8C, 9A-9C, and 10A-10B. According to some embodiments, process 1200 may be implemented by one or more components of navigation system 100, such as at least one processing unit 110. According to some embodiments, process 1200 may be implemented by system 100 associated with vehicle 200.

At step 1202, in some embodiments, a system receives multiple images of a roadway in the vicinity of a moving vehicle associated with the system. In some embodiments, the one or more images are acquired using at least one image capture device, such as image capture devices 122, 124, and/or 126. The plurality of images may be received by the system through a data interface such as data interface 128. In the example illustrated in FIGS. 8A-8C, system 100 may acquire a plurality of images of roadway 800 in the vicinity of vehicle 200.

At step 1204, in some embodiments, the system recognizes a first roadway lane constraint. In some embodiments, the system may use image analysis techniques to process the one or more images received to detect lane constraints by identifying objects, markings, or other characteristics in the images that are indicative of a lane constraint, such as lane markings, roadway edges, lane dividers, and/or other vehicles. In some embodiments, the system may attempt to identify at least one lane constraint on one side of the vehicle and another lane constraint on the other side of the vehicle (e.g., one lane constraint to each side of the center line of the vehicle in its traveling direction, front to back). In some embodiments, the system may attempt to identify at least one lane constraint on one side of a lane and another lane constraint on another side of the lane. In the example illustrated in FIGS. 8A-8C, system 100 may analyze the images received of roadway 800, and may detect lane constraint 804 on the left side of lane 802 as corresponding to and coinciding with solid lane line 803a. That is, in some embodiments, lane line 803a may be recognized by system 100 in the multiple acquired images, and system 100 may determine that lane line 803a is a visual marker for lane constraint 804.

At step 1206, in some embodiments, the system determines, based on the multiple images, whether one or more defined lane prediction conditions are satisfied. In some embodiments, a lane prediction condition may be any predetermined condition by which system 100 may determine whether to predict the location of a lane constraint. In some embodiments, only one lane prediction condition need be satisfied, while in other embodiments, a minimum threshold number of lane prediction conditions (e.g., two or more) need to be satisfied. In some embodiments, the minimum threshold number of lane predication conditions can be determined in accordance with historical information regarding the roadway lane layout, the roadway topology, shadow conditions, visibility conditions, presence of guard rails and/or other barriers along the roadway, presence of other vehicles on the roadway, etc.

In some embodiments, the one or more defined lane prediction conditions comprise that the second roadway lane constraint ceases to be recognized, based on the multiple images, as the vehicle progresses. For example, in some embodiments, the system may continuously capture and consult multiple images corresponding to the vehicle's current location and vicinity; as the vehicle travels along a roadway and along a lane, a lane constraint that was recognizable at one instance in time based on one subset of the multiple images may cease to be recognizable at a subsequent instance in time based on a later subset of the multiple images. In the example of FIGS. 8A-8C, system 100 may analyze the images received of roadway 800 as vehicle 200 travels along roadway 800 from its position in FIG. 8A to its position in FIG. 8B. As vehicle 200 travels from its position in FIG. 8A to its position in FIG. 8B, it reaches the middle portion of roadway 800 at which dotted lane line 803b is not painted on roadway 800. Upon analyzing the received multiple images from this middle portion of roadway 800, system 100 may cease to recognize lane constraint 806 due to the absence of lane line 803b. This ceasing to recognize a lane constraint as vehicle 200 progresses along roadway 800 may constitute a lane prediction condition in some embodiments.

In some embodiments, the one or more defined lane prediction conditions comprise that the lane constraint on the first side of the lane has been recognized for at least a threshold time or a threshold distance. Optionally, a threshold time or a threshold distance associated with the one or more defined lane prediction conditions can be dynamic and can be adjusted according to historical information regarding the roadway lane layout, the roadway topology, shadow conditions, visibility conditions, presence of guard rails or other barriers along the roadway, presence of other vehicles on the roadway, etc. In some embodiments, such a lane prediction condition may serve to prevent the system from (or reduce the likelihood of the system) engaging in lane constraint prediction when the system detects a lane constraint on a single side of a lane (or a single side of a vehicle) for a first time. That is, in some embodiments, if a vehicle is traveling and comes upon a single lane line or other lane marking or indicator for the first time, the system may refrain from predicting the location of another lane constraint based on the single lane marking/indicator. In some embodiments, this lane prediction condition may serve to ensure (or increase the likelihood) that the system is making valid and accurate lane constraint predictions based on actual lanes that exist on a roadway, and not on isolated, stray, or erroneously or randomly placed lane markings/indicators. In some embodiments, a predefined threshold distance may be fixed in the system, or may be determined by the system based on a current speed of the vehicle, the size or posted speed of the roadway on which the vehicle is traveling, or any other discernible variables regarding the vehicle or roadway.

In some embodiments, the one or more defined lane prediction conditions comprise that a guard rail is present in the vicinity of the vehicle. In some embodiments, the system may engage in lane constraint prediction when the system determines that the vehicle is in the vicinity of a guard rail. In some embodiments, this lane prediction condition may serve to prevent the system from erroneously determining that one or more edges detected in the one or more images correspond to a lane constraint, when in reality the one or more edges is associated with a guard rail or with a guard rail shadow. In some embodiments, a guard rail may cast a shadow onto a roadway, and an edge of the shadow on the roadway may be detected by the image analysis techniques used by the system. In some embodiments, the system may erroneously determine that the guard rail shadow is a marker of a lane constraint, and may cause the vehicle to travel in accordance with the guard rail shadow rather than with the actual lane constraint. In some embodiments, in order to prevent this error, the system may recognize that a guard rail is present in the vicinity of the vehicle, and may therefore engage in lane constraint prediction to predict the location of a lane constraint on the side of a lane with a guard rail, rather than attempting to recognize the lane constraint on that side of the lane and risking erroneously recognizing the guard rail shadow as a lane constraint.

In the example of FIGS. 10A and 10B, vehicle 200 (shown in FIG. 10B; not shown in FIG. 10A, as vehicle 200 constitutes the point of view in FIG. 10A) is traveling on roadway 1000 in lane 1002, which has guard rail 1012 to the left side of lane 1002. In some embodiments, system 100 may analyze the one or more images to detect that guard rail 1012 is present in the vicinity of vehicle 200 on the left side of lane 1002. In some embodiments, the presence of guard rail 1012 may satisfy a lane prediction condition.

In some embodiments, determining that a guard rail is present in the vicinity of the vehicle comprises detecting, in the one or more images, a pattern created by posts supporting the guard rail. In some embodiments, the system may be configured to detect one or more patterns in the one or more images that is known or suspected to be indicative of the presence of a guard rail. One such pattern may, in some embodiments, be referred to as a "rapid dash" pattern, and may be present when the system detects in the one or more images a pattern of rapid successive dashes or rapid successive lines caused by the posts supporting a guard rail. In some embodiments, the system may be configured to detect any other suitable pattern or visual indicia known to be characteristic of the posts that support guard rails. In some embodiments, the system may detect a pattern of the posts of a guard rail, while in some embodiments the system may alternatively or additionally detect a pattern of the shadows cast by the posts of a guard rail. In the example of FIGS. 10A and 10B, guard rail 1012 is supported by posts 1014 (shown in FIG. 10A; not visible from the overhead angle of FIG. 10B). In FIGS. 10A and 10B, posts 1014 are casting a shadow that falls onto roadway 1000 and into lane 1002. System 100 may detect the presence of a rapid dashed pattern or any other suitable pattern created in the multiple images by posts 1014 or their shadows, and this detection may be one manner in which system 100 determines that a guard rail is present in the vicinity of vehicle 200.

In some embodiments, system 100 may utilize depth information to identify a shape that is characteristic of a guard rail or of a portion of a guard rail. It would be appreciated that a painted line would have substantially no volume, and its height is virtually zero relative to the roadway surface, and so, depth information can be useful to distinguish between a lane marking and a guard rail.

In some embodiments, the one or more defined lane prediction conditions comprise that a guard rail is casting a shadow onto the roadway. In some embodiments, a lane prediction condition may be based on the detection by the system of a shadow of a guard rail, in place of or in addition to detection by the system of a guard rail itself. In some embodiments, a lane prediction condition may be satisfied if a guard rail shadow is detected anywhere in the vicinity of the vehicle; in some embodiments, a lane prediction condition may be satisfied if a shadow is detected as being cast from a guard rail in the direction of a lane or a roadway in or on which the vehicle is traveling; in some embodiments, a lane prediction condition may be satisfied if a shadow is detected as being cast from a guard rail onto a roadway or lane in which the vehicle is traveling.

In some embodiments, determining that a guard rail is casting a shadow onto the roadway may involve determining whether a predicted location of the sun comports with the location of a detected edge that is possible a guard rail shadow. For example, in some embodiments, the system may determine a position of the sun and an orientation of the sun with respect to the multiple images available to the system. These determinations as to the location of the sun and the orientation of the vehicle may be made in accordance with various pieces of information including, for example, one or more of the multiple images, a location and/or orientation of the vehicle determined by a GPS, an orientation of the vehicle determined by a compass, and/or a time of day. The system may determine, based on the determined location of the sun and orientation of the vehicle that a shadow is predicted to be cast from a guard rail in a certain direction at a certain time.

In the example of FIGS. 10A and 10B, guard rail 1012 is casting shadow 1016 onto roadway 1000 and into lane 1002; shadow 1016 falling on roadway 1000 and in lane 1002 may be detected by system 100, and said detection may satisfy a lane prediction condition.

In some embodiments, the one or more defined lane prediction conditions comprise that multiple substantially parallel edges are detected, in the multiple images, on the roadway on one side of a lane on the roadway. In some embodiments, image analysis techniques applied by the system to the multiple images received may detect edges in one or more of the multiple images received; in some embodiments, the detection of edges may be used to recognize objects and markings in the environment around the vehicle. In some embodiments, the detection of edges in the multiple images may be used to recognize lane lines or markings or the edges or roadways, and to thereby determine the location of lane constraints. In some embodiments, including those in which a guard rail shadow is cast onto a roadway or lane in which the vehicle is traveling, the system may detect the edge of a guard rail shadow as an edge in the multiple images. In some other embodiments, other objects or markings may cause the system to detect multiple edges on the same side of one lane. In these embodiments, determination of which edge corresponds to the correct lane constraint may be difficult, slow, or unreliable. For this reason, it may be advantageous in some embodiments to refrain from attempting to determine, based on the multiple images, which of several detected edges corresponds to a lane constraint, and instead to simply predict the location of the lane constraint using lane constraint prediction when multiple edges are detected in the multiple images as discussed above. In the example of FIGS. 10A and 10B, system 100 detects, in the multiple images, three different edges on the left side of lane 1002, indicated by the bolded lines marked 1004, 1005a, and 1005b. In the example of FIGS. 10A and 10B, as explained above, system 100 may determine that multiple edges are detected on the left side of lane 1002, and this detection may constitute a lane prediction condition.

In some embodiments, if it is determined, at block 1206, that one or more defined lane prediction conditions are not satisfied, then method 1200 may return to step 1202 and may continue to acquire additional images of the roadway as time progresses.

In some embodiments, if it is determined, at block 1206, that one or more defined lane prediction conditions are satisfied, then method 1200 may proceed to step 1208. At step 1208, in some embodiments, in accordance with a determination that one or more defined lane prediction conditions are satisfied, the system predicts the location of a second roadway lane constraint. In some embodiments, the system may predict a lane constraint on the opposite side (the vehicle being a reference as to direction of the opposite side) of a lane from a detected lane constraint. Thus, in some embodiments, if one lane constraint is recognizable from lane lines or other visible indicia in the received images, and lane prediction conditions such as any of the conditions discussed above are determined to be satisfied, then the system may predict the location of the second lane constraint on the opposite side of the lane from the first lane constraint.

In some embodiments, the predicted lane constraint may be predicted to extend for a predetermined distance along the roadway. In some embodiments, the predicted lane constraint may be predicted to be parallel to the recognized lane constraint opposite it. In some embodiments, the predicted lane constraint may be predicted to continue along the same angle, path, or location as the same lane constraint was previously detected by the system. In some embodiments, the predicted lane constraint may be predicted based on the location of another lane constraint, based on the location of other discernible features of a roadway, or based on the location of the vehicle associated with the system and/or on surrounding vehicles. In some embodiments, the predicted lane constraint may be predicted as being located a predetermined distance from a recognized lane constraint or from any other object recognized or predicted based on the multiple images of the roadway. In some embodiments, the predicted lane constraint may be predicted to be a lane constraint type that matches or is determined in accordance with other lane constraint types detected in the multiple images, or determined in accordance with a lane constraint type determined for the predicted lane constraint based on previous images of the roadway from a previous time (e.g., if a system detects a solid single white line on the right side of the vehicle, then ceases to detect any lane line, the system may predict that a solid single white lane constraint continues on the right side of the vehicle; alternately or additionally, a system may predict that a solid single white line is located on the opposite side of a lane from a solid single yellow line).

In the example of FIGS. 8A-8C, system 100 recognizes lane constraint 804 based on the detection of lane line 803*a* in the multiple images. When vehicle 200 reaches its position in FIG. 8B and does not detect any lane lines on the right side of lane 802, then a lane prediction condition may be satisfied. Accordingly, in some embodiments, system 100 may predict lane constraint 806 on the right side of lane 802, as shown in FIG. 8B. In some embodiments, lane constraint 806 may be predicted as a single dashed line lane constraint, based on the previous recognition, in FIG. 8A based on lane lines 803*b*, of lane constraint 806 as a single dashed line lane constraint. In some embodiments, the position, angle, type, and/or any other characteristic of lane constraint 806 may be predicted based on any stored or otherwise determined information accessible by system 100 about vehicle 200, roadway 800, or any other surrounding environmental factors.

In some embodiments, predicting the location of a lane constraint comprises predicting a width of a lane based on information about a previously determined width of the lane. In some embodiments, a width of a lane may be predicted based on historical information about lane width or cached information about the width of a specific lane in the recent past (e.g., a few seconds before lane constraint prediction was performed). In some embodiments, when a system is detecting both constraints of a lane and may thereby determine the width of that lane, and the system then ceases to detect or recognize one of the lane constraints, then the system may predict that the lane continues to be the same width. The system may accordingly predict the location of the predicted lane constraint such that the lane is predicted to remain constant or substantially constant in width. In the example of FIGS. 8A-8C, when system 100 is predicting the location of lane constraint 806 in FIG. 86, constraint 806 is predicted as being a distance 812 from lane constraint 804. This distance 812 may be the same distance 812 that was detected between lane constraint 806 and lane constraint 804 when vehicle 200 was in the position shown in FIG. 8A. System 100 may, in some embodiments, log or cache historical information about lane width, such that it can quickly recall lane width information in order to predict the location of a predicted lane constraint.

At step 1210, in some embodiments, the system enables the moving vehicle to avoid the first roadway lane constraint and the second roadway lane constraint. Thus, in some embodiments, the system may cause the vehicle to travel in a lane defined on one side by a detected/recognized lane constraint and on the opposite side by a predicted lane constraint. In some embodiments, the system may cause any suitable steering, accelerating, decelerating, or other control of the vehicle to cause it to travel within the lane defined by the predicted and detected lane constraints. In the example of FIGS. 8A-8C, when system 100 detects lane constraint 806 in FIG. 8B, system 100 then causes vehicle 200 to travel along lane 802 between detected lane constraint 804 and predicted lane constraint 806 to travel from its position in FIG. 8B to its position in FIG. 8C.

At step 1212, in some embodiments, the system determines whether one or more defined lane prediction cancellation conditions are satisfied. In some embodiments, a lane prediction cancellation condition may be any predetermined condition by which the system may determine whether to cease predicting the location of a lane constraint. In some embodiments, the location of a lane constraint may continue to be predicted once the system begins predicting the location of the lane constraint until one or more predefined lane prediction cancellation conditions are satisfied. In some embodiments, only one lane prediction cancellation condition need be satisfied in order for lane prediction to cease. In some embodiments, a predefined number or lane prediction conditions greater than one must be satisfied in order for lane prediction to be ceased. Optionally, a confidence score may be assigned to a lane prediction condition according to predefined criteria. Optionally, some lane prediction condition can have a greater weight than others. Still further by way of example, an overall score can be computed to determine whether a lane prediction cancellation condition is met, and such a calculation can take into account confidence scores and weights which were assigned to lane prediction conditions.

In some embodiments, the one or more defined lane prediction cancellation conditions comprise that, after ceasing to be recognized, the second lane constraint is recognized based on the one or more images. For example, in some embodiments, as the vehicle is traveling along a roadway, a lane constraint may cease to be recognized (as discussed above), such as when a roadway is unmarked or lane lines are not detectable in the multiple images; lane prediction may be accordingly performed, as discussed above. In some embodiments, thereafter, for example as the vehicle continues to travel along the roadway, the system may once again recognize the lane constraint in the multiple images as the system continues to acquire new images. For example, if a vehicle reaches a portion of the roadway where the lane lines are no longer missing, or if the lane lines otherwise become detectable by the system once more, the system may recognize the lane constraint based on the updated images of the roadway. This recognition of the second lane constraint—the lane constraint that was being predicted—may in some embodiments constitute a lane prediction cancellation condition that may cause the system to cease to predict the location of the second lane constraint and to instead return to reliance on the detected/recognized location of the lane constraint based on the multiple images.

In the example of FIGS. 8A-8C, while system 100 may be predicting the location of lane constraint 806 when vehicle 200 is located at the position shown in FIG. 8B, as vehicle 200 continues to the position shown in FIG. 8C, the dashed lane lines 803*b* on the upper half of the diagram may once again be visible in the images acquired by system 100. Based on these new images, system 100 may once again detect/recognize the presence of lane constraint 806 based on lane line 803b, and this recognition may constitute a lane prediction cancellation condition that triggers the cessation of the prediction of the location of lane constraint 806.

In some embodiments, the one or more defined lane prediction cancellation conditions comprise that a driver is moving the vehicle between lanes. In some embodiments, the system may determine based on the multiple images that the driver is steering or merging the vehicle to another lane. In some embodiments, this detection may satisfy a lane prediction cancellation condition and may trigger the cessation of lane constraint location prediction.

In some embodiments, the one or more defined lane prediction cancellation conditions comprise that the vehicle is traversing a curve that exceeds a predefined sharpness threshold. In some embodiments, the system may access a predefined or dynamically determined (e.g., determined in accordance with vehicle speed, posted speed limit, road conditions, weather conditions, environment brightness, the vicinity of other vehicles, etc.) sharpness threshold for curves, and may determine whether a curve in a roadway or a lane exceeds the sharpness threshold (e.g., is sharper than the maximum permissible sharpness). If it is determined that a curve being traversed or approached by the vehicle exceeds the maximum permissible sharpness, then the system may determine that a lane prediction cancellation condition is satisfied, and may accordingly cease lane constraint prediction.

In some embodiments, determining whether one or more defined lane prediction cancellation conditions are satisfied comprises selecting a maximum lane prediction distance setting, and determining whether a distance traveled by the vehicle while predicting the location of the second roadway lane constraint is greater than a maximum lane prediction distance associated with the maximum lane prediction distance setting. In some embodiments, a maximum lane prediction distance may be predefined, set, or dynamically determined by the system. In some embodiments, the system may monitor the distance traveled by the vehicle while the system is predicting the location of a lane constraint, and may cease to predict the location of the lane constraint if the distance traveled exceeds the maximum permissible lane prediction distance. In some embodiments, implementation of a maximum permissible lane prediction distance may improve safety and functionality by ensuring that the system does not predict the location of a lane constraint for an overly-long period of time or over an overly-long distance, over which distance or time one or more characteristics of the lane or the roadway may change or vary. As characteristics of lanes and roadways can be expected, in some embodiments, to change or vary over space and time, the system may improve safety by ensuring that lane constraint reference points or indicators, such as lane lines or other lane markers, are detected based on the multiple images acquired by the system at least once over a maximum lane prediction distance (or, in some embodiments, a maximum lane prediction time).

In some embodiments, the maximum lane prediction distance may be varied by the system in different situations. In some embodiments, a maximum lane prediction distance may be associated with one or more maximum lane prediction distance settings, such that the system may select one maximum lane prediction distance setting and implement the associated maximum lane prediction distance. In some embodiments, different maximum lane prediction distance settings may be implemented in different driving scenarios, as detected and determined by the system.

In some embodiments, a standard or default maximum lane prediction distance setting may be associated with a standard or default maximum lane prediction distance. In some embodiments, the standard or default maximum lane prediction distance may be 18 meters.

In the example of FIGS. 8A-8C, vehicle 200 has traveled distance 814 from its position in FIG. 8B, at which point lane constraint prediction was commenced, to its position in FIG. 8C, at which point lane prediction is ceased. This distance 814 may be less than a standard or default maximum lane prediction distance of 18 meters, such that lane constraint prediction may have been performed continuously between the positions of vehicle 200 in FIGS. 8B and 8C.

In some embodiments, selecting a maximum lane prediction distance setting comprises, in accordance with a determination that a first lane is merging with a second lane in the vicinity of the vehicle, selecting a maximum lane prediction distance setting such that the maximum lane prediction distance is greater than a default maximum lane prediction distance. In some embodiments, the system may thus implement an extended or increased maximum lane prediction distance. For example, in some embodiments, the system may determine, based on the multiple images, that a lane is merging with the lane in which the vehicle is traveling, or that the lane in which the vehicle is traveling is merging with another lane. The system may determine that a lane merge is occurring in the vicinity of the vehicle by detecting a lane constraint (e.g., by recognizing a lane line) on the far side of the merging lane adjacent to the vehicle's lane, and by determining that the lane constraint on the opposite side of the adjacent lane is approaching the lane in which the vehicle is traveling at above a predefined or dynamically determined threshold rate of approach. That is, in some embodiments, the system may recognize the far side of an adjacent lane approaching the lane in which the vehicle is traveling as the vehicle progresses along a roadway, and may accordingly determine that the adjacent lane is merging with the lane in which the vehicle is traveling.

In some embodiments, roadways may be expected to feature long distances of unmarked lane constraints when two lanes are merging with one another, so it may be advantageous for the system to be configured to predict the location of a lane constraint for a greater distance and/or a greater time than a default maximum lane prediction distance or time. In some embodiments, the increased maximum lane prediction distance associated with lane merge situations may be 1000 meters.

In the example of FIGS. 9A-9C, vehicle 200 has traveled distance 914 from its position in FIG. 9B, at which point lane constraint prediction was commenced, to its position in FIG. 9C, at which point lane prediction is ceased. This distance 914 may be greater than a standard or default maximum lane prediction distance, such that lane constraint prediction may have been ceased before vehicle 200 reached its position in FIG. 9C if the default maximum lane prediction distance setting was selected. However, as indicated by the bolded line in FIG. 8B, system 100 recognized lane constraint 922 on the right side of lane 916 approaching lane 902 as vehicle 200 progressed, and may have accordingly determined that the lanes were merging and that a maximum lane prediction distance setting associated with lane merges should be selected. The selected setting may be associated with a maximum lane prediction distance of 1000 meters, greater than the default maximum lane prediction distance of 18 meters. Thus, in some embodiments, distance 914 may be less than the increased maximum lane prediction distance of 1000 meters, such that lane constraint prediction may have been performed continuously between the positions of vehicle 200 in FIGS. 9B and 9C.

In some embodiments, selecting a maximum lane prediction distance setting comprises, in accordance with a determination that defined guard-rail conditions are satisfied, selecting a maximum lane prediction distance setting having no maximum lane prediction distance. That is, in some embodiments, when system 100 detects that guard-rail conditions are satisfied, system 100 may predict the location of a lane constraint indefinitely, without regard for any maximum lane prediction distance. In this way, in some embodiments, the maximum lane prediction distance associated with guard-rail conditions may be thought of as an infinite maximum distance, or as a non-existent maximum distance.

In some embodiments, guard-rail conditions may be satisfied in any situation where the system detects the presence of one or more guard rails, guard rail supports, and/or guard rail shadows in the vicinity of the vehicle. For example, guard-rail conditions may be satisfied in any or all of the situations discussed above in which the system may determine that a guard rail and/or a guard rail shadow are present in the vicinity of the vehicle and/or on a roadway or lane in which the vehicle is traveling. In some situations, guard-rail conditions may be satisfied when the presence, location, and/or orientation of a guard rail and/or guard rail shadow causes the system to engage in lane constraint prediction, as discussed above.

In some embodiments, it may be advantageous for no maximum lane prediction distance (or an infinite maximum lane prediction distance) to be applied in situations in which a guard rail and/or guard-rail shadow is present, because guard rails and their associated shadows can be expected to persist continuously for very long distances along roadways (often greater than a default maximum lane prediction distance or even an increased lane prediction distance associated with lane merges). In the example of FIGS. 10A and 10B, when system 100 begins predicting the location of lane constraint 1004 due to the detection of guard rail shadow 1016, system 100 may select a maximum lane prediction distance setting associated with guard rail conditions; the selection of a maximum lane prediction distance setting associated with guard rail conditions may cause the system to perform lane prediction of lane constraint 1004 without being subject to any maximum lane prediction distance.

In some embodiments, if it is determined, at block 1212, that one or more defined lane prediction cancellation conditions are not satisfied, then method 1200 may return to step 1202 and may continue to acquire additional images of the roadway as time progresses.

In some embodiments, if it is determined, at block 1212, that one or more defined lane prediction cancellation conditions are satisfied, then method 1200 may proceed to step 1214. At step 1212, in some embodiments, in accordance with a determination that one or more lane prediction cancellation conditions are satisfied, the system ceases to predict the location of the second lane constraint. In the example of FIGS. 8A-8C, when vehicle 200 reaches its position depicted in FIG. 8C, a lane prediction cancellation condition may be satisfied by the recognition of lane constraint 806 based on lane line 803b, and system 100 may therefore cease to predict the location of lane constraint 806. Instead, system 100 may resume determining the position of lane constraint 806 based on the detected location of lane line 803b, as it did previously in FIG. 8A.

Construction Zone Detection and Response

System 100 may provide vehicle 200 with construction zone detection, such that the system recognizes the presence of construction zones on roadways and takes action in accordance therewith. In some embodiments, system 100 may recognize various elements in the one or more images that it receives and may determine, in accordance with the recognition of those one or more elements, that vehicle 200 is approaching or inside a construction zone. In some embodiments, any automated or driver-assist action may be taken in accordance with the detection of a construction zone, including but not limited to changing the speed of vehicle 200, steering vehicle 200, engaging or disengaging one or more lights of vehicle 200, etc. In some embodiments, in accordance with the detection of a construction zone, a signal may be outputted by system 100 that indicates that a construction zone has been detected and/or that a construction zone mode is activated. In some embodiments, in accordance with the detection of a construction zone (and/or in accordance with the detection of a complex construction zone), automated or driver-assist control of vehicle 200 by system 100 may be disabled, such that control of vehicle 200 may be returned to the driver.

Figure 13:
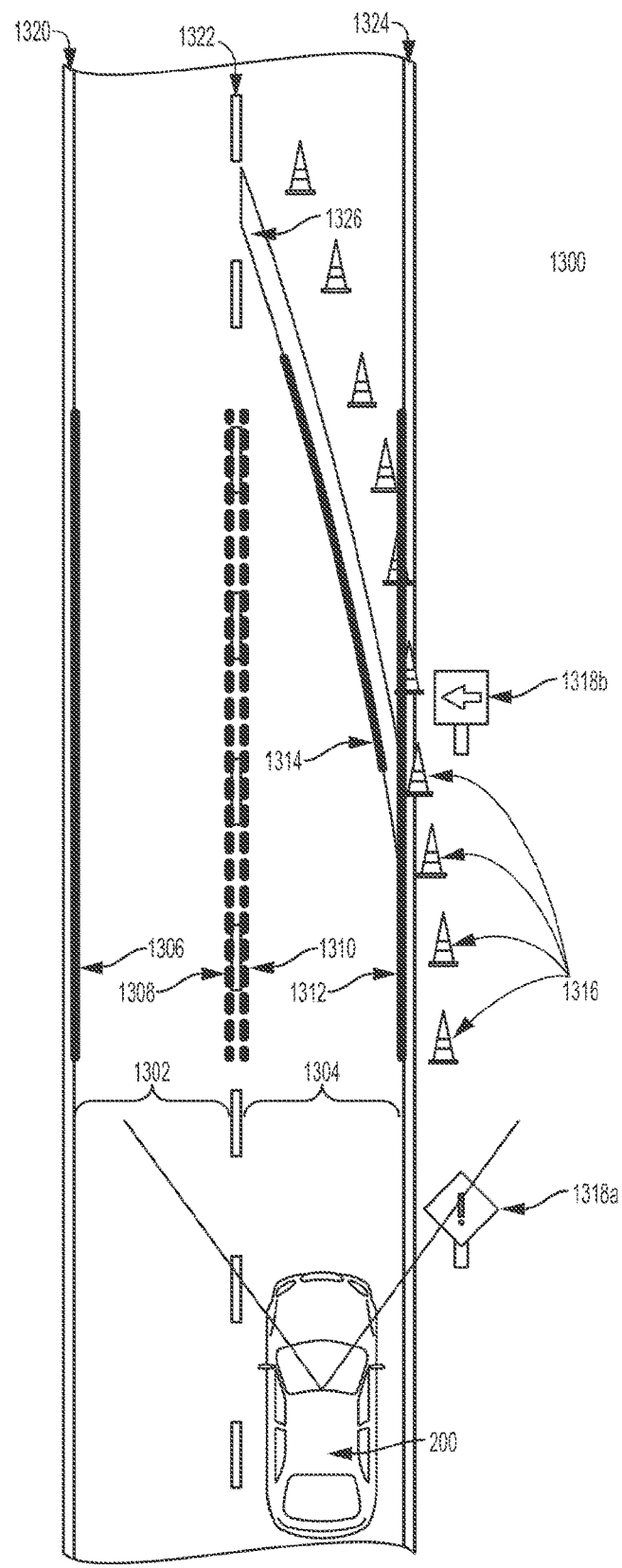
FIG. 13 is a depiction of a vehicle traveling along a roadway in accordance with some embodiments.

FIG. 13 illustrates an embodiment in which vehicle 200 is traveling on roadway 1300 and approaching a construction zone. Roadway 1300 has two lanes 1302 and 1304. Lane 1302 is defined by lane constraints 1306 and 1308, while lane 1304 is defined by lane constraints 1310 and 1312. These lane constraints are detected by system 100, as shown by the bolded lines indicating lane constraints 1306, 1308, 1310, and 1312. Lane constraints 1306 and 1308 are marked on roadway 1300 by painted lane lines 1320 and 1322, respectively; while lane constraints 1310 and 1312 are marked by on roadway 1300 by painted lane lines 1322 and 1324, respectively.

Roadway 1300 includes several indicators of a construction zone or construction area, including painted construction zone lane line 1326. In some embodiments, construction zone lane lines may be painted in a different color and/or different style than conventional lane lines. For example, in Germany, yellow lane lines are painted on the road to indicate a construction zone, while conventional lane lines are painted in white. As indicated by the bolded line, system 100 detects construction zone lane constraint 1314 based on painted construction zone lane line 1326. In accordance with the detection of construction zone lane constraint 1314, system 100 may cause vehicle 200 to drive within the lane defined by construction zone lane constraint 1314 rather than the conventional lane constraints. In some embodiments, when system 100 has detected that vehicle 200 is in a construction zone, construction zone lane lines may be given precedence over conventional lane lines.

Roadway 1300 may include additional construction zone indicators, including cones 1316, some of which are located on the surface of roadway 1300 and inside lane 1304. In response to detecting cones 1316, system 100 may cause vehicle 200 to alter its path so as to avoid cones 1316, changing a position in a lane of travel or changing lanes if necessary. In response to detecting cones 1316, system 100 may determine that vehicle 200 is in or near a construction zone; activate a construction zone mode; output a construction zone signal; disable automated or driver-assist control of vehicle 200; and/or control vehicle 200 by changing its speed, steering it, or taking any other appropriate action (such as to avoid cones 1316).

Roadway 1300 may include additional construction zone indicators, including construction road signs 1318a and 1318b, which may indicate the presence of a construction zone and/or indicate an instruction for drivers to follow while in the construction zone (e.g., slow, stop, merge, turn, etc.). System 100 may detect construction road signs 1318*a* and 1318*b* through the manner in which the system may detect any or all other traffic signs, and may take any appropriate action in response to detection of construction road signs 1318*a* and 1318*b*, including determining that vehicle 200 is in or near a construction zone; activating a construction zone mode; outputting a construction zone signal; disabling automated or driver-assist control of vehicle 200; and/or controlling vehicle 200 by changing its speed, steering it, or taking any other appropriate action (such as in accordance with an instruction on a construction road sign).

Figure 14:
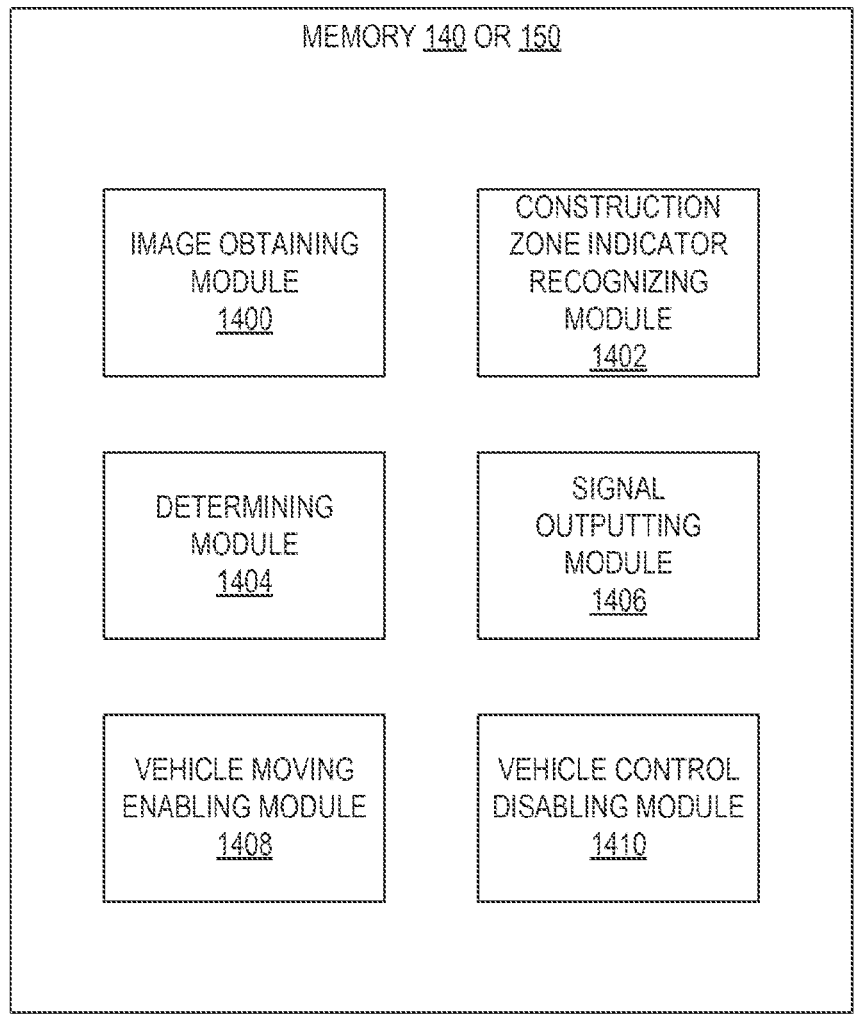
FIG. 14 is a diagrammatic representation of the memory of an exemplary system consistent with some disclosed embodiments.

FIG. 14 is an exemplary block diagram of memory 140 or 150, which may store instructions for performing one or more operations consistent with disclosed embodiments. As illustrated in FIG. 14, memory 140 or 150 may store one or more modules for performing construction-zone detection as described herein. For example, memory 140 or 150 may store image obtaining module 1400, construction zone indicator recognizing module 1402, determining module 1404, signal outputting module 1406, vehicle moving enabling module 1408, and vehicle control disabling module 1410. As would be appreciated by a person of ordinary skill in the art, any of the previously recited modules may be combined with each other or with other modules, interfaced with one another or with other modules, and/or subdivided into further modules and/or sub-modules.

In some embodiments, processing unit 110 may execute instructions stored on the one or more modules in memory 140 or 150, and the execution by processing unit 110 may cause system 100 to perform the methods discussed herein.

In some embodiments, processing unit 110 may cause system 100 to obtain (e.g., with image obtaining module 1400) multiple images from a camera (e.g., image capture devices 122, 124, and/or 126), wherein the camera is adapted to capture, when mounted on a vehicle (e.g., vehicle 200), and while the vehicle is in motion, images of a roadway within a field of view of the camera, apply image processing to the multiple images to recognize (e.g., with construction zone indicator recognizing module 1402) one or more indicators of a construction zone, and, in accordance with recognizing the one or more indicators of a construction zone, output (e.g., with signal outputting module 1406) a signal indicating that the vehicle is proximate to a construction zone.

In some embodiments, processing unit 110 may cause system 100 to determine (e.g., with determining module 1404), based on the one or more indicators, that the vehicle is proximate to a construction zone, and in accordance with a determination that the vehicle is proximate to a construction zone, output (e.g., with signal outputting module 1406) the signal indicating that the vehicle is proximate to a construction zone.

In some embodiments processing unit 110 may cause system 100 to, in accordance with the determination that the vehicle is proximate to a construction zone, cause the moving vehicle (e.g., with vehicle moving enabling module 1408) to move in accordance with the construction zone indicators.

In some embodiments processing unit 110 may cause system 100 to determine (e.g., with determining module 1404), based on the one or more indicators, that the construction zone is a complex construction zone, and in accordance with a determination that the construction zone is a complex construction zone, disable (e.g., with vehicle control disabling module) automated vehicle control functionality.

Figure 15:
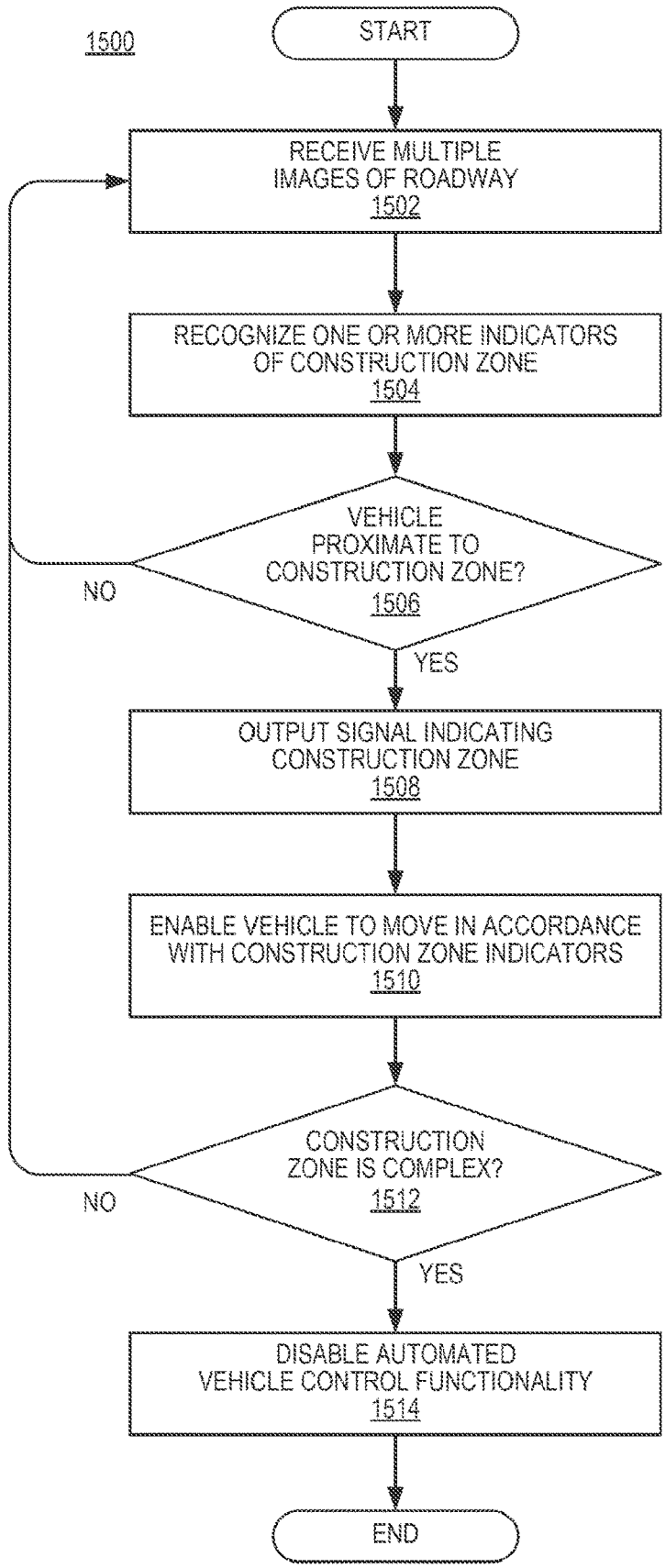
FIG. 15 is a flowchart of an exemplary process in accordance with some embodiments.

FIG. 15 illustrates a process 1500 for implementing lane constraint prediction consistent with the disclosed embodiments. In some embodiments, the steps in process 1500 may be illustrated by the situations illustrated in FIG. 13. According to some embodiments, process 1500 may be implemented by one or more components of navigation system 100, such as at least one processing unit 110. According to some embodiments, process 1500 may be implemented by a system 100 associated with a vehicle 200.

At step 1502, in some embodiments, a system receives multiple images of a roadway in the vicinity of a moving vehicle associated with the system. In some embodiments, the one or more images are acquired using at least one image capture device, such as image capture devices 122, 124, and/or 126. The plurality of images may be received by the system through a data interface such as data interface 128. In the example illustrated in FIG. 13, system 100 may acquire a plurality of images of roadway 1300 in the vicinity of vehicle 200.

At step 1504, in some embodiments, the system recognizes, in the multiple images, one or more indicators of a construction zone. In some embodiments, the system may use image analysis techniques to process the one or more images received to detect signs, objects, other vehicles, marked lane lines, and any other objects or characteristics of a surrounding environment. In some embodiments, certain signs, markings, lane lines, objects, and/or combinations of any such detected aspects may be predetermined by the system to be indicators of a construction zone. In some embodiments, cones, barrels, flashing lights, poles, barriers, and/or markers present in the vicinity of the roadway may be predetermined by the system to be indicators of a construction zone. In some embodiments, predefined traffic signs, such as those bearing text, symbols, or images known to indicate a construction zone, may be predetermined by the system to be indicators of a construction zone. In some embodiments, lane lines may be determined by the system to be indicators of a construction zone. For example, in Germany, construction zones may be marked with special construction zone lane lines painted on roadways, the construction zone lane lines possibly being of a different color or a different appearance than conventional lane lines. The system may detect lane lines of a color, appearance, orientation, and/or location that indicates to the system that the lines are construction zone lane lines, and the system may recognize such construction zone lane lines as indicators of a construction zone.

In the example of FIG. 13, system 100 may recognize cones 1316, construction road signs 1318*a* and 1318*b*, and/or painted construction zone lane line 1326. In some embodiments, any or all of those elements may be predetermined by system 100, or dynamically determined by system 100, to be construction zone indicators.

At step 1506, in some embodiments, the system determines, based on the one or more indicators, whether the vehicle is proximate to a construction zone. In some embodiments, a system may determine based on the proximity (to the vehicle, roadway, or lane) of construction zone indicators that the vehicle is proximate to a construction zone. In some embodiments, a system may assume based on the orientation or placement with respect to a roadway or a lane that the vehicle is proximate to a construction zone. In some embodiments, a system may determine from the content (e.g., the images, symbols, and/or text) of one or more road signs that the vehicle is proximate to a construction zone. In some embodiments, a minimum threshold number of construction zone indicators must be detected within a maximum threshold time of one another in order for a system to determine that the vehicle is proximate to a construction zone. In the example of FIG. 13, system 100 may determine based on the simultaneous detection of cones 1316, construction road signs 1318a and 1318b, and/or painted construction zone lane line 1326 that vehicle 200 is proximate to a construction zone.

In some embodiments, if it is determined, at block 1506, that the vehicle is not proximate to a construction zone, then method 1500 may return to step 1502 and may continue to acquire additional images of the roadway as time progresses.

In some embodiments, if it is determined, at block 1506, that the vehicle is proximate to a construction zone, then method 1500 may proceed to step 1508. At step 1508, in some embodiments, in accordance with a determination that the vehicle is proximate to a construction zone, the system outputs a signal indicating that the vehicle is proximate to a construction zone. In some embodiments, the signal output by system 100 may be an electronic signal or an electronic message that communicates to any component of the system or to any associated system that a construction zone is detected. For example, a signal may be sent to a display system associated with the system, or a signal may be sent to any other local or remote system communicatively coupled with the system. In some embodiments, the signal may be perceptible by a driver of the vehicle. For example, the signal may be a visible signal (such as a lighted indicator or a displayed element on a computer or entertainment system display), an audible signal emitted by a speaker system, and/or a haptic signal such as a vibration.

At step 1510, in some embodiments, in accordance with the determination that the vehicle is proximate to a construction zone, the system enables the moving vehicle to move in accordance with the construction zone indicators. In some embodiments, in response to determining that the vehicle is proximate to a construction zone, the system may cause the vehicle to be accelerated, decelerated, steered, or otherwise controlled and moved in accordance with the detected construction zone indicators. In some embodiments, the vehicle may be automatically slowed to a reduced speed to increase safety. In some embodiments, the vehicle may be steered or caused to change lanes so as to follow construction zone lane lines, avoid cones/barrels/poles/barriers or other construction zone indicators, or follow instructions indicated on road signs indicating or associated with the construction zone. In the example of FIG. 13, system 100 may modify a course of travel of vehicle 200 such that vehicle 200 follows detected lane constraint 1314 in accordance with construction zone lane line 1326 (rather than lane constraint 1312 detected in accordance with lane line 1324), avoids cones 1316, and obeys traffic sign 1318b (which includes a symbol instructing vehicle 200 to merge left). In some embodiments, vehicle 200 may be caused to accordingly merge from lane 1304 left into lane 1302.

At step 1512, in some embodiments, the system determines, based on the one or more indicators, whether the construction zone is a complex construction zone. In some embodiments, a complex construction zone may be a construction zone having one or more predefined or dynamically determined characteristics associated by the system with a construction zone in which autonomous and/or driver-assist control of a vehicle may be unsafe, in which autonomous and/or driver assist control of a vehicle may be unreliable or undependable, or in which control of a vehicle should be returned to a driver of the vehicle. In some embodiments, a complex construction zone may be a construction zone where an obstruction exists in a lane or on a roadway on or in which the vehicle is traveling. In some embodiments, a complex construction zone may be a construction zone in which a predefined or dynamically determined threshold number of cones/barrels/poles/barriers or other construction zone indicators are detected within a threshold distance or threshold time of one another. That is, in some embodiments, when a construction zone is densely populated with construction zone indicators, it may be determined to be a complex construction zone. In the example of FIG. 13, in some embodiments, roadway 1300 may be determined by system 100 to contain a complex construction zone, based on the presence of cones 1316 on roadway 1300, cones 1316 in lane 1304, a minimum threshold number of cones 1316 being detected, and or a minimum threshold number of total construction zone indicators being detected.

In some embodiments, if it is determined, at block 1512, that the construction zone is not a complex construction zone, then method 1500 may return to step 1502 and may continue to acquire additional images of the roadway as time progresses.

In some embodiments, if it is determined, at block 1512, that the construction zone is a complex construction zone, then method 1500 may proceed to step 1514. At step 1514, in some embodiments, in accordance with a determination that the construction zone is a complex construction zone, the system may disable automated vehicle control functionality. In some embodiments, driver assist functionality may be disabled. In some embodiments, fully automated driving functionality may be disabled. In some embodiments, full control (e.g., acceleration, deceleration, steering, etc.) of vehicle 200 may be returned by system 100 to the driver of vehicle 200.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. Further, it is to be understood that the functionality of the program modules described herein is not limited to the particular type of program module named herein, but rather can be programmed in any suitable manner across among one or more modules or other software constructs.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A device mountable on a vehicle, comprising:
a camera adapted to capture multiple images of a roadway within a field of view of the camera; and
a processor configured to:
apply image processing to the multiple images to recognize, in the multiple images, an indicator of a construction zone, the indicator of the construction zone including at least one of: cones, barrels, or poles present in the vicinity of the roadway; and
output a signal in response to recognizing the indicator of the construction zone, the signal used to initiate a navigational response of the vehicle.

2. The device of claim 1, wherein the navigational response includes causing the vehicle to discontinue autonomous driving mode.

3. The device of claim 1, wherein the navigational response includes causing the vehicle to activate a construction zone driving mode.

4. The device of claim 1, wherein initiating the navigational response of the vehicle comprises one of: causing the vehicle to reduce speed; causing the vehicle to change a lane in which the vehicle is traveling; enabling avoiding cones, barrels, poles, or barriers; or causing the vehicle to follow construction zone lane constraints rather than conventional lane constraints.

5. The device of claim 1, wherein the processor is configured to:
determine, based on the indicator of the construction zone, that the construction zone is a complex construction zone; and
disable automated vehicle control functionality based on the determination.

6. The device of claim 5, wherein the determination that the construction zone is a complex construction zone comprises the recognition of one of: cones present in a lane in which the vehicle is present, barrels present in a lane in which the vehicle is present, poles present in a lane in which the vehicle is present, or barriers present in a lane in which the vehicle is present.

7. The device of claim 5, wherein the determination that the construction zone is a complex construction zone comprises the recognition that a number of cones, barrels, poles, or barriers in the vicinity of the vehicle, alone or in combination, exceed a predefined threshold number.

8. The device of claim 5, wherein the processor is configured to:
monitor the roadway to continually determine whether the construction zone is a complex construction zone using additional images obtained from the camera.

9. A device mountable on a vehicle, comprising:
a camera adapted to capture multiple images of a roadway within a field of view of the camera; and
a processor configured to:
apply image processing to the multiple images to recognize, in the multiple images, an indicator of a construction zone, the indicator of the construction zone including an apparatus to control traffic flow over the roadway; and
output a signal in response to recognizing the indicator of the construction zone, the signal used to alter an autonomous navigational mode of the vehicle.

10. The device of claim 9, wherein the apparatus includes at least one of: cones, barrels, or poles present in the vicinity of the roadway, or barriers present on the roadway.

11. The device of claim 9, wherein to alter the autonomous navigational mode of the vehicle, the signal causes the vehicle to discontinue autonomous driving mode.

12. The device of claim 9, wherein to alter the autonomous navigational mode of the vehicle, the signal causes the vehicle to activate a construction zone driving mode.

13. The device of claim 9, wherein the processor is configured to initiate a navigational response of the vehicle based on the indicator of the construction zone.

14. The device of claim 13, wherein the navigational response of the vehicle comprises one of: causing the vehicle to reduce speed; causing the vehicle to change a lane in which the vehicle is traveling; enabling avoiding cones, barrels, poles, or barriers; or causing the vehicle to follow construction zone lane constraints rather than conventional lane constraints.

15. A computer system comprising:
a memory that stores instructions; and
a processor that executes the instructions to cause the system to:
apply image processing to multiple images of a roadway to recognize, in the multiple images, an indicator of a construction zone, the indicator of the construction zone including an apparatus to control traffic flow over the roadway; and
output a signal in response to recognizing the indicator of the construction zone, the signal used to alter an autonomous navigational mode of a vehicle.

16. The computer system of claim 15, wherein the apparatus includes at least one of: cones, barrels, or poles present in the vicinity of the roadway, or barriers present on the roadway.

17. The computer system of claim 15, wherein to alter the autonomous navigational mode of the vehicle, the signal causes the vehicle to discontinue autonomous driving mode.

18. A vehicle, comprising:
a body;
a camera adapted to capture, when mounted on the vehicle, and while the vehicle is in motion, multiple images of a roadway within a field of view of the camera; and
a processor configured to:
apply image processing to the multiple images to recognize, in the multiple images, an indicator of a construction zone, the indicator of the construction zone including an apparatus to control traffic flow over the roadway; and
output a signal in response to recognizing the indicator of the construction zone, the signal used to alter an autonomous navigational mode of the vehicle.

19. The vehicle of claim 18, wherein the image processing is performed using monocular image analysis.

* * * * *